US010777202B2

(12) United States Patent
Mindlin et al.

(10) Patent No.: US 10,777,202 B2
(45) Date of Patent: Sep. 15, 2020

(54) METHODS AND SYSTEMS FOR SPEECH PRESENTATION IN AN ARTIFICIAL REALITY WORLD

(71) Applicant: Verizon Patent and Licensing Inc., Arlington, VA (US)

(72) Inventors: Samuel Charles Mindlin, Brooklyn, NY (US); Kunal Jathal, Los Angeles, CA (US); Mohammad Raheel Khalid, Budd Lake, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 158 days.

(21) Appl. No.: 16/012,704

(22) Filed: Jun. 19, 2018

(65) Prior Publication Data

US 2019/0385613 A1 Dec. 19, 2019

(51) Int. Cl.
*G10L 15/26* (2006.01)
*G10L 17/00* (2013.01)
*G10L 25/84* (2013.01)

(52) U.S. Cl.
CPC .......... *G10L 15/265* (2013.01); *G10L 17/005* (2013.01); *G10L 25/84* (2013.01)

(58) Field of Classification Search
CPC ..... G10L 15/26; G10L 15/265; G10L 17/005; G10L 19/008; G10L 25/84; G10L 15/22; G10L 15/02; G10L 21/0272; G10L 15/28; G06F 17/289; H04N 7/157; H04R 5/033; H04S 7/303; H04S 7/304

See application file for complete search history.

(56) References Cited

U.S. PATENT DOCUMENTS

| 9,443,518 | B1 * | 9/2016 | Gauci | G06Q 30/0277 |
| 9,530,426 | B1 * | 12/2016 | Wright | H04S 1/002 |
| 9,767,803 | B1 * | 9/2017 | Wakeford | G10L 15/28 |
| 10,573,312 | B1 * | 2/2020 | Thomson | G10L 15/26 |
| 2004/0080611 | A1 * | 4/2004 | Kakii | G09B 5/06 348/14.16 |
| 2004/0172252 | A1 * | 9/2004 | Aoki | G10L 21/0208 704/270 |
| 2009/0125590 | A1 * | 5/2009 | Hayano | H04L 65/403 709/205 |

(Continued)

*Primary Examiner* — Abdelali Serrou

(57) ABSTRACT

An exemplary speech presentation system receives a simulated binaural audio signal associated with a media player device that is presenting an artificial reality world to a user. The simulated binaural audio signal is representative of a simulation of sound propagating to an avatar representing the user within the artificial reality world. The speech presentation system further receives acoustic propagation data representative of an aspect affecting propagation of sound to the avatar within the artificial reality world. Based on the acoustic propagation data, the speech presentation system extracts an auto-transcribable speech signal from the simulated binaural audio signal. The auto-transcribable speech signal is representative of speech originating from a speaker within the artificial reality world. Based on the auto-transcribable speech signal, the speech presentation system generates a closed captioning dataset representative of the speech and provides the dataset to the media player device. Corresponding methods and systems are also disclosed.

20 Claims, 11 Drawing Sheets

(56) References Cited

U.S. PATENT DOCUMENTS

| | | | |
|---|---|---|---|
| 2011/0302535 A1* | 12/2011 | Clerc | G06F 3/04815 |
| | | | 715/848 |
| 2012/0290950 A1* | 11/2012 | Rapaport | H04N 21/8358 |
| | | | 715/753 |
| 2014/0163982 A1* | 6/2014 | Daborn | G10L 15/26 |
| | | | 704/235 |
| 2016/0080684 A1* | 3/2016 | Farrell | H04N 9/8211 |
| | | | 386/227 |
| 2017/0277257 A1* | 9/2017 | Ota | G06F 3/013 |
| 2018/0115853 A1* | 4/2018 | Lehtiniemi | H04S 7/303 |
| 2018/0139562 A1* | 5/2018 | Eronen | H04S 7/30 |
| 2018/0249274 A1* | 8/2018 | Lyren | H04S 7/303 |
| 2019/0026936 A1* | 1/2019 | Gorur Sheshagiri | |
| | | | G02B 27/0093 |
| 2019/0080692 A1* | 3/2019 | R | G10L 21/0272 |
| 2019/0116450 A1* | 4/2019 | Tsingos | G10K 15/12 |

\* cited by examiner

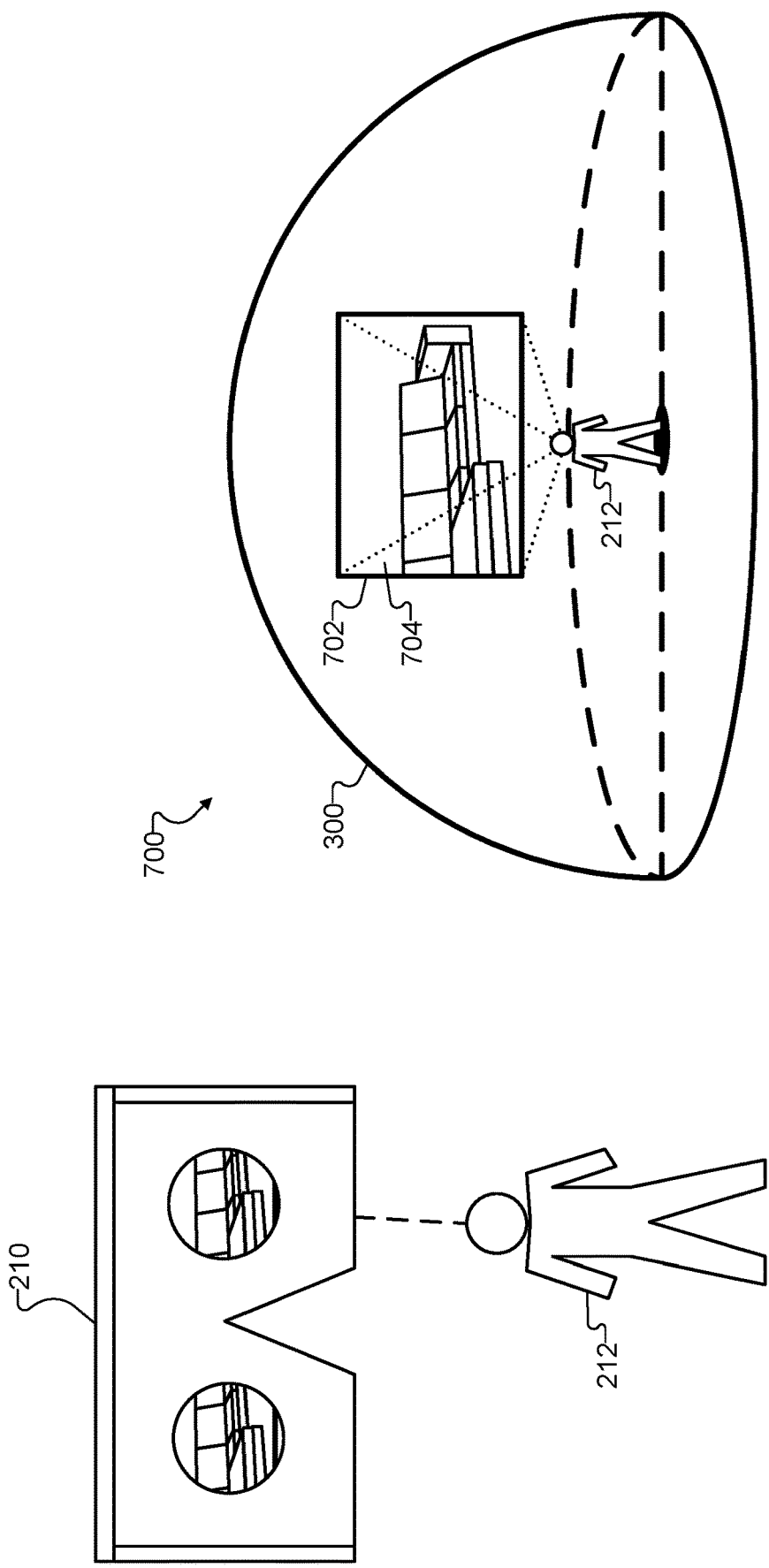

METHODS AND SYSTEMS FOR SPEECH PRESENTATION IN AN ARTIFICIAL REALITY WORLD

BACKGROUND INFORMATION

Artificial reality technologies (e.g., virtual reality technology, augmented reality technology, mixed reality technology, etc.) allow users to experience artificial reality worlds. For example, artificial reality worlds may be implemented as partially or fully simulated realities that do not exist in the real world as such, or that do exist in the real world but are difficult, inconvenient, expensive, or otherwise problematic for users to experience in real life (i.e., in a non-simulated manner). Artificial reality technologies may thus provide users with a variety of entertainment experiences, educational experiences, vocational experiences, and/or other enjoyable or valuable experiences that may be difficult or inconvenient for the users to experience otherwise.

As in the real world, certain artificial reality worlds may immerse users in complex and chaotic audio environments. For instance, an artificial reality world may include a significant number of people speaking at once, as well as various other types of noise, reverberation, and other sound propagation effects that, in combination, may make it difficult for users to distinguish and understand speech in the artificial reality world. This difficulty to understand may significantly diminish the benefits of the artificial reality experience that the users might otherwise enjoy.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7A illustrates an exemplary media player device that may be used by a user to experience artificial reality media content according to principles described herein.

FIG. 7B illustrates an exemplary artificial reality experience according to principles described herein

DETAILED DESCRIPTION OF PREFERRED EMBODIMENTS

Figure 1:
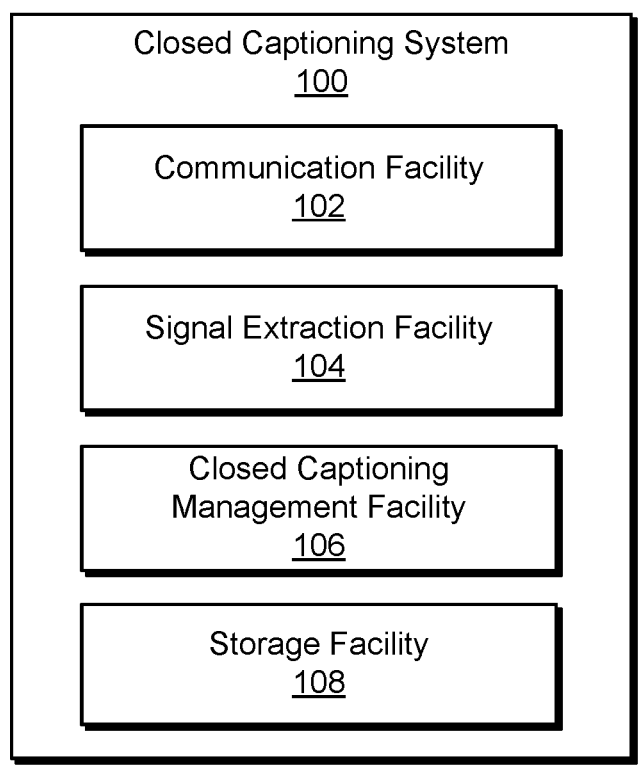
FIG. 1 illustrates an exemplary system for speech presentation in an artificial reality world according to principles described herein.

Methods and systems for speech presentation in an artificial reality world are described herein. For example, as will be described in more detail below, an exemplary speech presentation system (e.g., an exemplary closed captioning system) may facilitate understanding of speech presented in an artificial reality world by performing, sequentially or concurrently and in any suitable order, one or more of the following operations and/or other operations described herein.

First, the speech presentation system may receive a simulated binaural audio signal associated with a media player device that is presenting an artificial reality world to a user of the media player device. The simulated binaural audio signal may be representative of a rendered simulation of sound propagating to an avatar representing the user within the artificial reality world. For example, the simulated binaural audio signal may be a signal configured to simulate for the user what the avatar hears in the audio environment of the artificial reality world (e.g., by including representations of sounds from various sources such as people speaking and other sound sources) and how the avatar hears it (e.g., by taking into account various aspects that affect the propagation of sound to the avatar such as reverberation and echoes in the room, where the avatar is positioned with respect to the sound sources, how the avatar and the sound sources are oriented with respect to one another, etc.).

Along with receiving the simulated binaural audio signal, the speech presentation system may further receive acoustic propagation data representative of at least one aspect affecting propagation of sound to the avatar. For example, the acoustic propagation data may represent one or more of the aspects affecting the propagation of sound described above that are accounted for in the simulated binaural audio signal to simulate how the user hears the sound presented to the avatar.

Based on the acoustic propagation data, the speech presentation system may extract from the simulated binaural audio signal an auto-transcribable speech signal representative of speech originating from a speaker within the artificial reality world. As used herein, a "speaker" may refer to any sound source from which speech may originate. For example, as will be described in more detail below, speakers may include avatars whose corresponding users are speaking, media content presentations (e.g., two-dimensional video presentations or audio presentations within the artificial reality world) that feature people speaking, non-player characters built into the artificial reality world who are speaking, or the like. Accordingly, an auto-transcribable speech signal may refer to an audio signal that is derived from the simulated binaural audio signal, but that only includes speech from one speaker (rather than multiple speakers who may be speaking concurrently within the artificial reality world), and that has had various aspects affecting the propagation of sound (e.g., noise, echoes, reverberation, distance-based attenuation, etc.) diminished or removed completely to facilitate automatic transcription of the signal by a speech-to-text converter.

Based on the auto-transcribable speech signal, the speech presentation system may generate a closed captioning dataset representative of the speech originating from the speaker. For example, a speech-to-text converter may operate on the auto-transcribable speech signal to generate closed captions (i.e., a textual transcription or set of subtitles indicative of what is being said) for the speech originating from the speaker. The system may also provide the closed captioning dataset to the media player device. For example, the system may transmit the closed captioning dataset along with data indicating that the closed captioning dataset corresponds to the speaker (e.g., rather than to another speaker who may be speaking concurrently within the artificial reality world).

Speech presentation methods and systems for facilitating understanding of speech presented in an artificial reality world may significantly improve conventional artificial reality systems and provide various benefits to users engaging in artificial reality experiences. For example, by operating directly on a simulated binaural audio signal that is being presented to the user, speech presentation systems described herein may be more versatile and effective than conventional systems would be. For instance, to function properly, conventional systems may require sound input signals to already be filtered and separated out so that the signals are easily transcribable by automated systems without additional processing. Additionally, conventional systems may require that input signals already be correlated with particular speakers so that closed captioning datasets generated may be properly correlated with the proper speakers.

In various examples, artificial reality worlds may include extremely complex sound environments with many speakers associated with varied and disparate speech sources such as users using a live chat feature within the artificial reality world, prerecorded speech stored on the media player device, live or prerecorded speech associated with media content presentations being transmitted from media providers (e.g., television providers, video-on-demand providers, web video providers, radio providers, etc.), and so forth. As such, it may not be practical, convenient, or even possible in some examples for a conventional system to receive individual auto-transcribable speech signals pre-correlated to correspond to each of these speech sources, particularly in real time.

Unlike conventional systems, the speech presentation systems described herein may be flexibly configured to operate based only on the simulated binaural audio signal (i.e., the input audio that is being rendered for presentation to the user by the media player device) and the acoustic propagation data (which is already known to the system since it was used to render the simulated binaural audio signal). Based only on these readily-available inputs, the speech presentation systems and methods described herein may thus generate closed captioning data for various disparate sources in real time without access to any particular filtered or separated versions of the speech signals or any metadata about the sources from which the signals originate.

In this way, the speech presentation methods and systems described herein may facilitate users' understanding of speech presented in artificial reality worlds in various ways. For example, as will be described in more detail below, the speech presentation systems described herein may provide great flexibility to users in being able to read real-time closed captions for speech that the users wish to focus on, while easily ignoring other speech that may be surrounding the respective avatars of the users within the artificial reality world. With this facilitated understanding, users will benefit from enjoyable and effective experiences within artificial reality worlds, even when the artificial reality worlds include complex and chaotic audio environments.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary speech presentation system 100 ("system 100") for facilitating understanding of speech presented in an artificial reality world. As shown, system 100 may include, without limitation, a communication facility 102, a signal extraction facility 104, a closed captioning management facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. Each of facilities 102 through 108 may be distributed between multiple devices (e.g., including suitable server-side devices and/or client-side devices) and/or multiple locations as may serve a particular implementation. Additionally, one or more of facilities 102 through 108 may be omitted from system 100 in certain implementations, while additional facilities may be included within system 100 in the same or other implementations.

In some examples, facilities 102 through 108 may be configured to operate in real time so as to analyze audio data and generate and provide closed captioning data as quickly as a simulated binaural audio signal is generated and presented to a user by a media player device. As used herein, operations may be performed in "real time" when they are performed immediately and without undue delay. For example, real-time data processing operations associated with an ongoing event (e.g., a virtual social gathering with other users, a real-world sporting event, etc.) may be completed while the event is still ongoing (e.g., rather than after the fact), even if there is some amount of delay such as a few seconds or minutes. As such, real-time operations may provide closed captioning data to facilitate understanding of artificial reality users who are experiencing a real-world event live or at approximately the same time as people attending the real-world event are experiencing it.

Each of facilities 102 through 108 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility, or may be implemented using shared computing components. Each of facilities 102 through 108 will now be described in more detail.

Communication facility 102 may be configured to perform various operations associated with requesting, accessing, or otherwise receiving input data for processing by system 100. For example, communication facility 102 may be configured to receive input data such as a simulated binaural audio signal, acoustic propagation data, and/or any other suitable input as may serve a particular implementation. The simulated binaural audio signal received by communication facility 102 may be associated with (and, in some examples, received from) a media player device that is presenting an artificial reality world to a user of the media player device. The simulated binaural audio signal may be representative of a simulation of sound propagating to an avatar representing the user within the artificial reality world. In other words, rather than receiving individual, separate signals for each of the distinct sounds (e.g., speech instances or other sounds) that may be presented to the avatar in the artificial reality world, communication facility 102 may receive only a single simulated binaural audio signal that includes a mixture of all the distinct sounds as the sounds are being presented to the user (i.e., a simulation of how the sounds would propagate and combine together at the virtual ears of the user's avatar).

Additionally, communication facility 102 may be configured to receive acoustic propagation data representative of various aspects affecting propagation of sound to the avatar within the artificial reality world. For example, acoustic propagation data may describe the different sounds mixed together in the simulated binaural audio signal and how these sounds have originated, mixed, and virtually propagated through the artificial reality world to reach the two ears of the avatar. As will be described in more detail below, acoustic propagation data may include various types of data as may serve a particular implementation. For instance, acoustic propagation data may describe the respective positioning of the avatar and the one or more sound sources (e.g., speakers) within the artificial reality world, the respective orientation of the avatar and the one or more sound sources, the propagation space through which sounds travel to reach the avatar (e.g., details about the walls, floors, ceilings, objects, and other surfaces included within the artificial reality world that may cause sound to echo and reverberate), and so forth.

In some examples, speech presentation system may be included within, communicatively coupled with, and/or otherwise associated with an artificial reality provider system that has applied many of the affects that the acoustic propagation data describes onto the sounds. For example, when a user experiencing an artificial reality world speaks into a microphone to utilize a chat feature (i.e., to speak to another user also experiencing the artificial reality world), the artificial reality provider system may receive the audio signal representative of the speaking user's speech and may apply various affects to it (e.g., echo, reverberation, attenuation, etc.) before mixing it into a simulated binaural audio signal presented to another user. As such, the artificial reality provider system may be able to provide the acoustic propagation data to a speech presentation system to facilitate the speech presentation system in reversing the applied affects for each particular sound source from which sound is originating in the simulated binaural audio signal.

To this end, signal extraction facility 104 may be configured to perform this reversal of affects applied to various sounds included within the simulated binaural audio signal, as well as to otherwise separate, filter, and "clean up" the various audio signals mixed into the simulated binaural audio signal. More particularly, signal extraction facility 104 may be configured to extract, from the simulated binaural audio signal and based on the acoustic propagation data, an auto-transcribable speech signal representative of speech originating from a speaker within the artificial reality world. As mentioned above, an auto-transcribable speech signal, as used herein, may refer to a speech signal that has been separated from other overlapping or concurrent speech signals and has been filtered (e.g., by removing propagation affects such as those described above) to a degree that the signal can be automatically transcribed by an automatic speech-to-text converter (e.g., a speech-to-text algorithm, hardware system, software program, or the like). Various details about how auto-transcribable speech signal may be extracted from a simulated binaural audio signal based on acoustic propagation data will be described in more detail below.

Closed captioning management facility 106 may be configured to generate a closed captioning dataset representative of the speech originating for the speaker based on the auto-transcribable speech signal extracted by signal extraction facility 104. Additionally, closed captioning management facility 106 may be configured to provide the closed captioning dataset to the media player device so that the closed captioning dataset may be presented to the user to facilitate the user's understanding of the speech as it is mixed together with various other sounds in the simulated binaural audio signal representing the complex sound environment of the artificial reality world.

Along with generating the closed captioning dataset and other closed captioning datasets for other speech instances mixed into the simulated binaural audio signal, closed captioning management facility 106 may further manage correlation data between different auto-transcribable speech signal (and associated closed captioning datasets) and the corresponding speakers from which the speech signals originate. In other words, closed captioning management facility 106 may be configured to not only convert each extracted auto-transcribable speech signal into a closed captioning dataset, but also to associate the auto-transcribable speech signal and the resultant closed captioning dataset with the speaker with whom they correspond (i.e., from whom the speech originates). As closed captioning management facility 106 provides the closed captioning dataset to the media player device for presentation to the user, correlation metadata indicative of which closed captioning dataset corresponds to which speaker may also be provided to allow the media player device to properly present the closed captions as originating from the appropriate speakers within the artificial reality world.

Storage facility 108 may store audio signals (e.g., simulated binaural audio signals, auto-transcribable speech signals, etc.) or buffered portions thereof, acoustic propagation data, program instructions, and/or any other data received, generated, managed, maintained, used, and/or transmitted by facilities 102 through 106.

Figure 2:
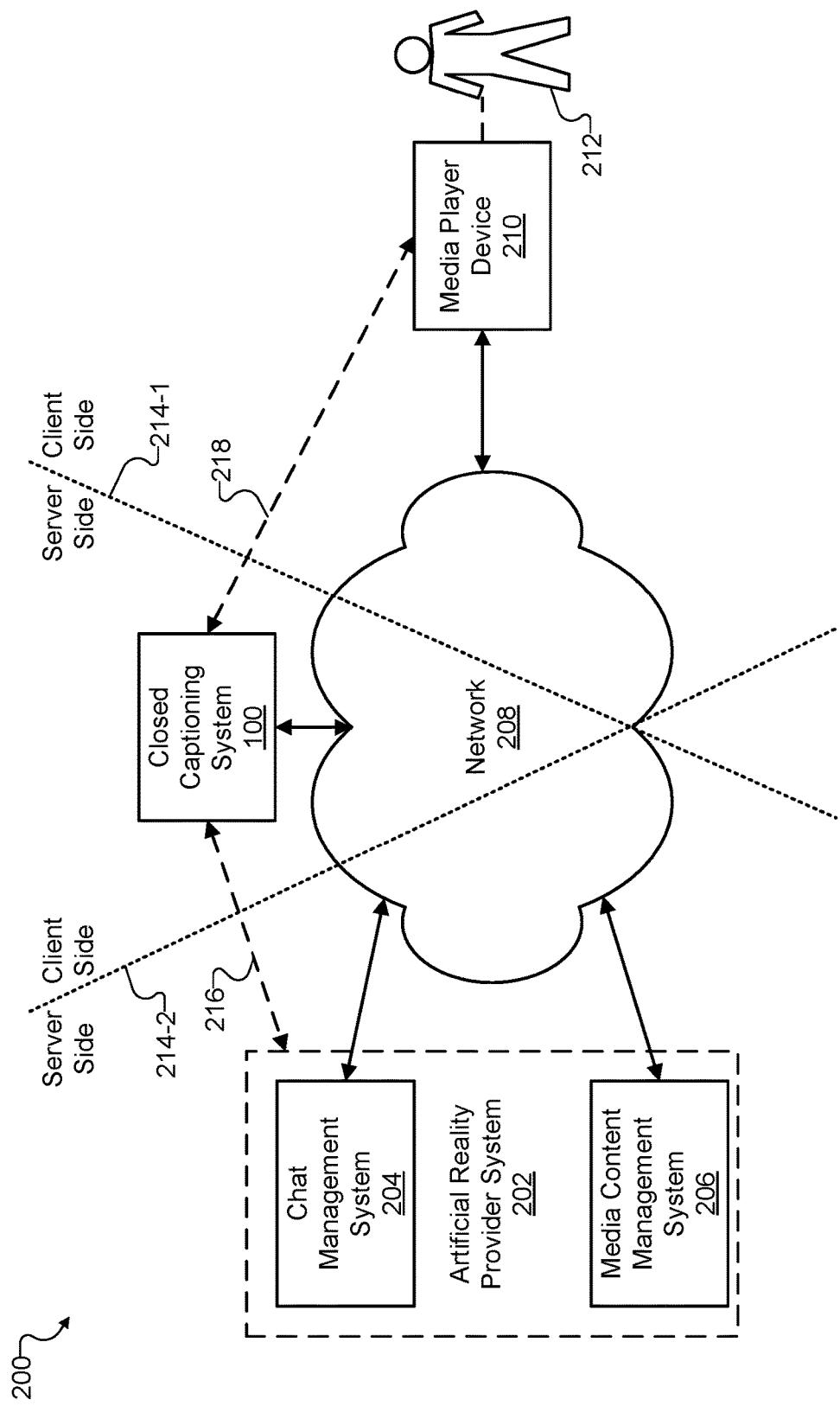
FIG. 2 illustrates an exemplary configuration in which the system of FIG. 1 operates to facilitate understanding of speech presented in an artificial reality world according to principles described herein.

To illustrate system 100 in operation, FIG. 2 shows an exemplary configuration 200 in which system 100 operates to facilitate understanding of speech presented in an artificial reality world. As shown in FIG. 2, an artificial reality provider system 202 that includes a chat management system 204 and a media content management system 206 is communicatively coupled, by way of a network 208, with a media player device 210 being used with a user 212. Additionally, configuration 200 is shown to include system 100, which is communicatively coupled with artificial reality provider system 202 and media player device 210 by way of network 208 and/or in other ways that will be described.

System 100 was described above in relation to FIG. 1, and each of the other components in configuration 200 will now be described.

Artificial reality provider system 202 may include one or more computing devices (e.g., server computers, database storage centers, etc.) responsible for capturing, accessing, generating, distributing, and/or otherwise providing and curating artificial reality media content (e.g., virtual reality media content, augmented reality media content, etc.) to be delivered to media player devices such as media player device 210. As such, artificial reality provider system 202 may generate and/or access (e.g., from one or more content creation systems not explicitly shown) artificial reality data such as image data, audio data, and the like. Artificial reality provider system 202 may also process, prepare, and deliver this data in a form that may be used by media player device 210 to present an artificial reality experience to user 212.

In some examples, such as the example illustrated by configuration 200, artificial reality provider system 200 may be made up of two or more subsystems each configured to perform particular tasks. For example, as shown in FIG. 2, chat management system 204 and media content management system 206 are examples of two subsystems that may be included within artificial reality provider system 202. While systems 204 and 206 are the only subsystems illustrated to be included within artificial reality provider system 202 in configuration 200, it will be understood that various other subsystems not explicitly shown may also be included within artificial reality provider system 202 or communicatively coupled thereto as may serve a particular implementation.

Chat management system 204 may serve as a central hub for hosting all chat communications that may occur within an artificial reality world being generated and provided by artificial reality provider system 202. For example, as user 212 and other users experiencing the same artificial reality world using other media player devices (not explicitly shown in FIG. 2) speak to one another, all the voice signals may pass through chat management system 204. Chat management system 204 may maintain, organize, process, and provide to media player device 210 any chat signals that may be relevant to user 212 (e.g., representative of speech that user 212 may expect to be able to hear based on the position of his or her avatar within the artificial reality world).

Chat management system 204 may receive speech signals representative of chat data in any way and/or using any digital or analog voice or data transmission technologies as may serve a particular implementation. For example, chat management system 204 may receive speech signals from users by way of over-the-top ("OTT") telecommunication serves in which data packets representative of voice communications are delivered over an Internet Protocol ("IP") network. In other examples, chat management system 204 may receive speech signals by way of more traditional telephonic communication technologies, or any other communication technologies as may serve a particular implementation.

In some examples, chat management system 204 may apply various propagation effects to each chat signal provided to media player device 210. For example, chat management system 204 may apply any of the effects described herein, such as a reverberation effect to simulate natural echoes in the virtual room in which the avatar of user 212 is standing, an attenuation effect to simulate the natural drop-off of the volume as the sound virtually propagates from a speaking avatar to the avatar of user 212, and so forth. Additionally, chat management system 204 may perform processing to facilitate other aspects of the artificial reality world being generated and provided by artificial reality provider system 202. For instance, chat management system 204 may perform sound processing to facilitate phoneme animation for the speaking avatar (i.e., to simulate moving of the speaking avatar's mouth in synchronicity with the speech).

Media content management system 206 may perform similar hosting functionality as chat management system 204, but for media content rather than chat communications between users. For example, within a particular artificial reality world, various media content such as two-dimensional video content (e.g., television, movies, web videos, etc.), three-dimensional video content, and radio or other audio-only content may be presented. For instance, in one exemplary artificial reality world, a virtual sports lounge may include various virtual television sets placed around the lounge area to provide real-time video streaming of the same types of content (e.g., live television channels) as may be presented in a real sports lounge. Accordingly, media content management system 206 may be configured to serve as a central hub for media content presentations that may be presented within the artificial reality world being generated and provided by artificial reality provider system 202. For example, media content management system 206 may access various live media content streams (e.g., television channels, radio channels, etc.), as well as media content that may be stored within media content management system 206 itself or within another subsystem of artificial reality provider system 202. Media content management system 206 may maintain, organize, process, and provide to media player device 210 any media content that may be relevant to user 212 (e.g., content user 212 may expect to be able to see and/or hear based on the position of his or her avatar within the artificial reality world).

As with chat management system 204, media content management system 206 may apply various propagation effects to each media content signal it provides to media player device 210. For example, media content management system 206 may apply any of the effects described herein, such as those described above in relation to chat management system 204.

Network 208 may provide data delivery means between server-side systems such as artificial reality provider system 202 and client-side systems such as media player device 210 in a server-client data delivery architecture such as implemented by configuration 200. As such, network 208 may include a provider-specific wired or wireless network (e.g., a cable or satellite carrier network, a mobile telephone network, a traditional telephone network, a broadband cellular data network, etc.), the Internet, a wide area network, a content delivery network, and/or any other suitable network or networks, and artificial reality media content may be distributed using any suitable communication technologies included within network 208. Data may flow between artificial reality provider system 202 and media player device 210 using any communication technologies, devices, media, and protocols as may serve a particular implementation.

In certain examples, network 208 may employ mobile edge computing or multi-access edge computing ("MEC") technologies to enable cloud computing capabilities at the edge of a cellular network (e.g., a 5G cellular network in certain implementations, or any other suitable cellular network associated with any other generation of technology in other implementations). For example, one or more servers included within artificial reality provider system 202 (e.g., servers implementing chat management system 204, media content management system 206, closed captioning system 100, or the like) may be implemented as MEC servers implemented on the edge of the cellular network so as to be communicatively and/or physically closer to client systems (e.g., media player device 210) than conventional servers would be in a server-client architecture that does not employ such technologies. In this way, communicative latency between client devices and MEC server devices may be reduced, leading to an artificial reality experience that is more responsive, more efficient, and more immersive and enjoyable to the user.

Media player device 210 may be configured to present artificial reality content (e.g., one or more artificial reality worlds) generated and provided by artificial reality provider system 202 to user 212. For example, media player device 210 may take any of various forms including a head-mounted virtual media content device (e.g., a virtual reality gaming device, a set of augmented reality glasses, etc.), a mobile or wireless device (e.g., a smartphone, a tablet device, etc.), or any other device or configuration of devices that may serve a particular implementation to facilitate receiving and/or presenting artificial reality media content to a user. Media player device 210 may represent one media player device to which an artificial reality world is provided, but it will be understood that a plurality of other similar media player devices may also be provided with the same artificial reality world so as to allow a plurality of other users to experience the artificial reality world concurrently with user 212. For example, as mentioned above, each of these users may chat with one another and/or with user 212 within the artificial reality world.

Along with various streams of video data that may be received from artificial reality provider system 202 (e.g., from subsystems not explicitly shown in configuration 200), media player device 210 may also receive streams of audio data from artificial reality provider system 202. For example, as described above, media player device 210 may receive chat signals from chat management system 204, as well as audio signals associated with media content presentations from media content management system 206. Media player device 210 may further receive audio directly from user 212 (e.g., by way of a microphone built into media player device 210) and/or may include, stored within a storage device built into media player device 210, additional audio that may be presented within the artificial reality world (e.g., such as audio associated with a non-player character within a particular artificial reality world, a particular artificial reality game, or the like).

Based on all the audio received from all of these sources, as well as based on information known to media player device 210 regarding the current position and orientation of an avatar of user 212 and of sound sources within the artificial reality world, media player device 210 may be configured to generate a simulated binaural audio signal to present to user 212. For instance, as described above, the simulated binaural audio signal may incorporate and mix together all the different sounds that user 212 may expect to hear in each ear based on sound propagation within the artificial reality world with respect to his or her avatar. In certain examples in which an artificial reality world is particularly complex (i.e., where there are a large number of speakers and/or other sound sources concurrently generating sounds), it may not be possible for media player device 210 to generate the simulated binaural audio signal to a suitable degree of quality in real time due to a lack of processing capability of the media player device. As such, in these examples, media player device 210 may provide information about the user's position and orientation (e.g., which direction the user's head is turned to, etc.) to an external system such as artificial reality provider system 202 or a system on the client side of network 208 that has additional processing capabilities, and this external system may generate the simulated binaural audio signal instead.

Once the simulated binaural audio signal has been generated, media player device 210 (or the external system that generated the simulated binaural audio signal instead of media player device 210) may provide the simulated binaural audio signal to system 100 to allow system 100 to perform the closed captioning operations described herein.

System 100 may be implemented as an independent system on either the server side or the client side of the server-client architecture, or may be combined with another system or device in configuration 200 as may serve a particular implementation. For instance, in some examples such as illustrated by an exemplary client-server division 214-1, system 100 may be implemented as a server-side system on the same side of network 208 as artificial reality provider system 202. Additionally, as illustrated by arrow 216, system 100 may be implemented within artificial reality provider system 202 (i.e., as an additional subsystem along with systems 204 and 206) or may be communicatively coupled directly with artificial reality provider system 202 such that communications with artificial reality provider system 202 may be direct rather by way of network 208.

In other examples, such as illustrated by another exemplary client-server division 214-2, system 100 may be implemented as a client-side system on the same side of network 208 as media player device 210. Additionally, as illustrated by arrow 218, system 100 may be implemented within media player device 210 or may be communicatively coupled directly with media player device 210 such that communications with media player device 210 are direct rather than by way of network 208.

Figure 3:
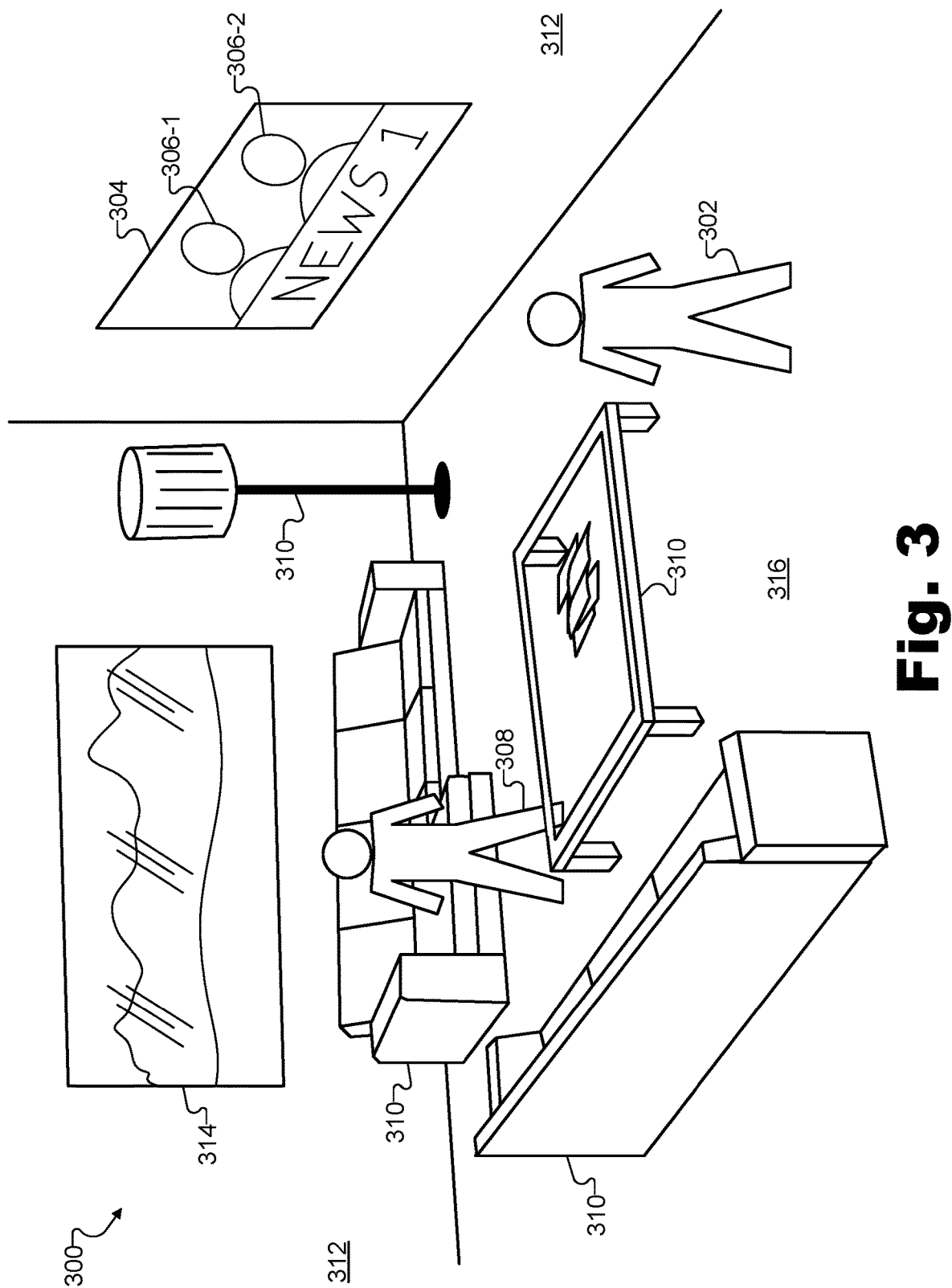
FIG. 3 illustrates a perspective view of an exemplary artificial reality world according to principles described herein.

FIG. 3 illustrates a perspective view of an exemplary artificial reality world 300. As shown, an avatar 302 representing user 212 may be included within artificial reality world 300. In other words, media player device 210 may present to user 212 (e.g., by way of a display screen and speakers included as part of media player device 210) the same things that avatar 302 virtually sees and hears in artificial reality world 300. For example, avatar 302 may virtually see and/or hear a media content presentation 304 including two speakers 306 (i.e., speakers 306-1 and 306-2, representing two news anchors on a news program) presented on a two-dimensional display screen (e.g., a virtual television screen or the like) within artificial reality world 300. As another example, avatar 302 may virtually see and/or hear one or more other avatars such as an avatar 308 illustrated in FIG. 3. Various additional objects 310 (e.g., sofas, light fixtures, coffee tables, etc.), as well as various walls 312, a window 314, a floor 316, and other objects not explicitly shown or designated in FIG. 3 may also be seen and/or heard by avatar 302. For example, while these inanimate objects 310 through 316 may not themselves act as sound sources, the objects may nevertheless affect the propagation of sound originating from speakers 306 and/or avatar 308. Additionally, it will be understood that additional sound sources not explicitly shown from the view of FIG. 3 may also be present within artificial reality world 300 (e.g., additional media content presentations, avatars, and/or other sound sources that are behind avatar 302 and may be heard but not seen by avatar 302 unless the avatar is turned around).

Artificial reality world 300 may be implemented using any type of artificial reality technology as may serve a particular implementation. For instance, artificial reality world 300 and the objects, avatars, and media content presentations included therein may generated using virtual reality technology and may be based on any scenery or objects as may serve a particular implementation. As one example, artificial reality world 300 may be an immersive virtual reality world generated based on a live (e.g., real-time) feed of camera-captured scenery of a real-world scene. In other examples, artificial reality world 300 may be an immersive virtual reality world generated based on camera-captured scenery of a real-world scene captured previously, or based on a completely virtualized (e.g., animated) world that does not include camera-captured scenery but, rather, is entirely computer generated.

In other implementations, artificial reality world 300 may be implemented using a type of artificial reality that is not completely virtual, such as augmented reality or mixed reality. In these examples, avatar 302 may be implemented by user 212 himself or herself and the room represented by artificial reality world 300 may be the real-world room in which user 212 is actually located. In these examples, certain objects illustrated in artificial reality world 300 may be objects around user 212 in the real world, while other objects may be virtually added to the world. For example, objects 310 may be real-world objects that user 212 may see and interact with (e.g., by sitting on one of the sofas), while avatar 308 may not actually be present in the room with user 212 but may be artificially added to artificial reality world 300 to be heard and seen by user 212. Other types of artificial reality may function in a similar manner or in any manner as may serve a particular implementation.

User 212 may view and interact with various objects included in artificial reality world 300 by way of avatar 302 as user 212 experiences artificial reality world 300. For example, user 212 may cause avatar 302 to walk into the room, to move around the room (e.g., to approach avatar 308 for a conversation), to sit on the sofa (e.g., to watch media content presentation 304), and so forth. Similarly, user 212 may cause avatar 302 to move into other areas or rooms of artificial reality world 300 that are not explicitly illustrated in FIG. 3, or to go to other artificial reality worlds that may be available.

As user 212 directs avatar 302 to move through artificial reality world 300, it may be desirable for user 212 to hear sounds (e.g., speech originating from avatar 308 or media content presentation 304, media content such as music, sound effects such as footsteps, etc.) as they would sound if user 212 were actually located in a real-world space like artificial reality world 300. To this end, system 100 may identify the position and orientation of avatar 302 and a particular sound source making a particular sound, and apply sound propagation effects to the sound to simulate various aspects of sound propagation.

Figure 4:
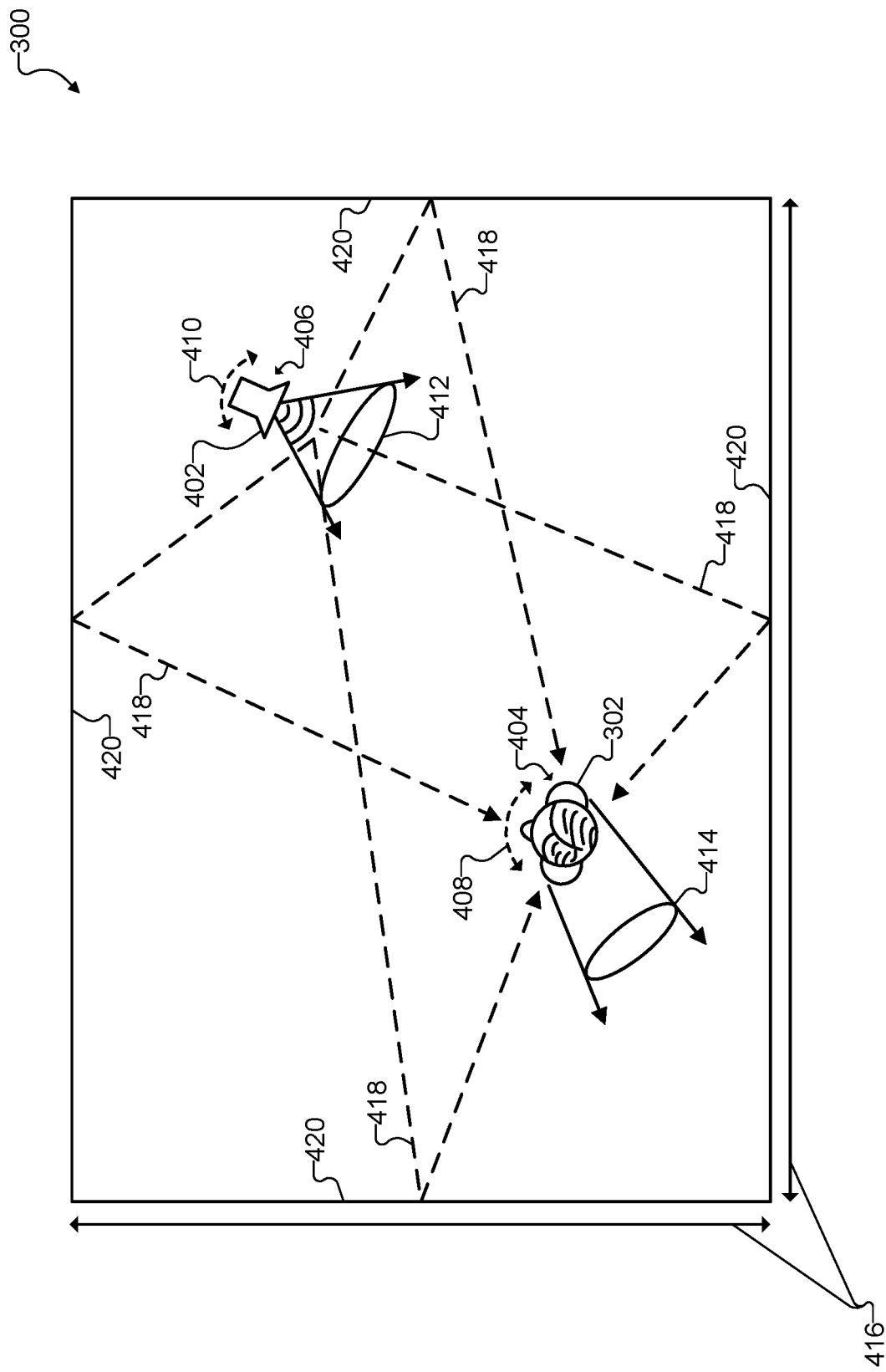
FIG. 4 illustrates exemplary aspects that may affect the propagation of sound from a speaker to an avatar within the artificial reality world of FIG. 3 according to principles described herein.

To illustrate, FIG. 4 shows exemplary aspects that may affect the propagation of sound from a speaker to an avatar within artificial reality world 300. Specifically, as shown, sound may virtually propagate from a speaker 402 to avatar 302 within artificial reality world 300 in accordance with various propagation aspects including a position 404 of avatar 302, a position 406 of speaker 402, an orientation 408 of avatar 302, an orientation 410 of speaker 402, a cone of propagation 412 of sound originating from speaker 402, a head shadow 414 caused by interference of the head and body of avatar 302 with sound originating from speaker 402, dimensions 416 of artificial reality world 300, various echoes 418 of the sound from various surfaces 420 within artificial reality world 300, and so forth as may serve a particular implementation.

While speaker 402 is depicted in FIG. 4 as a loudspeaker symbol, it will be understood that speaker 402 may be any suitable sound source from which speech originates within artificial reality world 300. For example, speaker 402 may be an additional avatar (e.g., avatar 308 illustrated in FIG. 3) representing, within artificial reality world 300, an additional user of an additional media player device that is presenting artificial reality world 300 to the additional user concurrently with the presenting of artificial reality world 300 to user 212. As another example, speaker 402 may be a speaker included on a media content presentation that is received from a media provider distinct from the media player device and is presented within artificial reality world 300. For instance, speaker 402 may be one of speakers 306-1 or 306-2, the news anchors on media content presentation 304 illustrated in FIG. 3.

As yet another example, speaker 402 may be a non-player character within the artificial reality world. In other words, rather than being an avatar representative of a real person who may wish to chat with user 212, speaker 402 may be a prerecorded or artificial intelligence ("AI") character presented based on data stored within the media player device (e.g., programmed into a game or the like that is loaded on the media player device). In some examples, the non-player character may be displayed at a particular place in the world such as at location 406 of speaker 402. In other examples, however, a non-player character may be displayed on a video overlay that is presented to user 212 in front of the depiction of artificial reality world 300, may be displayed on a control console within which artificial reality world 300 is presented, may not be displayed at all (e.g., serving as an auto-navigator who speaks into the user's ears), or may be displayed in any other suitable manner.

In still other examples, speaker 402 may be any other source of speech included within artificial reality world 300 as may serve a particular implementation.

Regardless of what type of sound source implements speaker 402, FIG. 4 shows that various aspects may affect the virtual propagation of speech from speaker 402 to each of the ears of avatar 302. For example, the relative positions 404 and 406 of avatar 302 and speaker 402 with respect to one another within artificial reality world 300 may affect the magnitude (e.g., loudness) of sound to be perceived by avatar 302. Specifically, as the distance between positions 404 and 406 increases, the volume to be perceived by avatar 302 of sound originating from speaker 402 may drop off according to a known fall-off curve.

As another exemplary propagation aspect, the relative orientations 408 and 410 of avatar 302 and speaker 402 (i.e., which directions avatar 302 and speaker 402 are facing with respect to one another and with respect to artificial reality world 300) may similarly affect how sound is perceived by avatar 302. For instance, speech originating from speaker 402 may tend to propagate with the greatest magnitude in the direction in which speaker 402 is oriented. This area is illustrated by cone of propagation 412 in FIG. 4. As such, a listener who is within cone of propagation 412 may hear speech originating from speaker 402 at a greater overall volume than a listener who is outside of cone of propagation 412 (i.e., who speaker 402 is facing away from). Additionally, along with overall volume effects, certain frequencies may be significantly attenuated outside of cone of propagation 412, causing speech to sound different for listeners outside of cone of propagation 412.

Similarly, head shadow 414 may represent a somewhat analogous concept for avatar 302 as cone of propagation 412 represents for speaker 402. That is, just as orientation 410 of speaker 402 affects how sound is projected into artificial reality world 300, orientation 408 of avatar 302 affects how sound is received from artificial reality world 300. Specifically, one ear of avatar 302 that is oriented in a direction away from a sound source (e.g., the left ear of avatar 302 in the example of FIG. 4) may receive a lower overall volume and/or a more attenuated version of certain frequencies of the sound due to interference from the head and/or other body parts than the ear that is oriented toward the sound source. This effect is referred to as an interaural level difference ("ILD"). A related phenomenon known as interaural time difference ("ITD") may also be affected by orientation 408 of avatar 302, thereby causing sound to arrive at the ear nearer to the sound source prior to arriving at the ear farther from the sound source. ILD and ITD cues may be applied to sounds presented to user 212 to help user 212 to localize sound sources in space (i.e., to determine, based on natural cues, where speaker 402 is within artificial reality world 300 in relation to avatar 302).

Along with natural propagation effects arising from the respective positions and orientations of speaker 402 and avatar 302 within artificial reality world 300, various aspects of artificial reality world 300 may further affect how sound propagates from speaker 402 to avatar 302. For example, dimensions 416 and other physical measurements associated with artificial reality world 300 (e.g., the shape of the room, the height of the ceiling, etc.) may have a direct impact on sound reverberation within artificial reality world 300. Specifically, echoes 418 off of various surfaces 420 (e.g., walls as well as other surfaces included within artificial reality world 300) may arrive to the ears of avatar 302 at different times based on dimensions 416 and other physical aspects of the room. Additionally, the virtual material from which surfaces 420 are constructed (e.g., whether being hard, flat material that efficiently reflects sound, soft or uneven material that absorbs and/or scatters sound, etc.) may further serve as significant propagation aspects that affect speech propagation to avatar 302.

While FIG. 4 shows an overhead, two-dimensional view of artificial reality world 300, it will be understood that the propagation aspects illustrated in FIG. 4 may be determined in three dimensions in a manner analogous to the real world. For instance, positions 404 and 406 may be three-dimensional positions that also include a height component not explicitly illustrated in the view of FIG. 4. Similarly, orientations 408 and 410, cone of propagation 412, head shadow 414, and echoes 418 may all be implemented in three dimensions rather than the two dimensions illustrated in FIG. 4.

While FIG. 4 illustrates a relatively simple example in which avatar 302 perceives sound from a single speaker 402, it will be understood that, in certain examples, a plurality of speakers may be concurrently speaking within artificial reality world 300. As such, in addition to extracting an auto-transcribable speech signal representative of speech from speaker 402, system 100 may be configured to further extract (e.g., from the same simulated binaural audio signal as contains the speech from speaker 402 and based on the same types of acoustic propagation data) an additional auto-transcribable speech signal representative of additional speech originating from an additional speaker within the artificial reality world. Additionally, based on the additional auto-transcribable speech signal, system 100 may generate an additional closed captioning dataset representative of the additional speech originating from the additional speaker, and may provide the additional closed captioning dataset to the media player device along with the closed captioning dataset.

For instance, the additional speaker may be included on a media content presentation that is received from a media provider distinct from the media player device and is presented within artificial reality world 300, while speaker 402 may be an additional avatar representing, within the artificial reality world, an additional user of an additional media player device (e.g., a media player device that is presenting artificial reality world 300 to the additional user concurrently with the presenting of artificial reality world 300 to user 212). In some examples, these auto-transcribable speech signals may be extracted even when at least a portion of the auto-transcribable speech signal and a portion of the additional auto-transcribable speech signal overlap in time so as to correspond to a period of time within artificial reality world 300 when speaker 402 and the additional speaker are speaking concurrently. Additionally, in the same or other examples, system 100 may be configured to correlate the generated closed captioning datasets to their respective speakers. Specifically, for instance, system 100 may provide the closed captioning dataset so as to correspond to the additional avatar, and the additional closed captioning dataset so as to correspond to the media content presentation.

Figure 5:
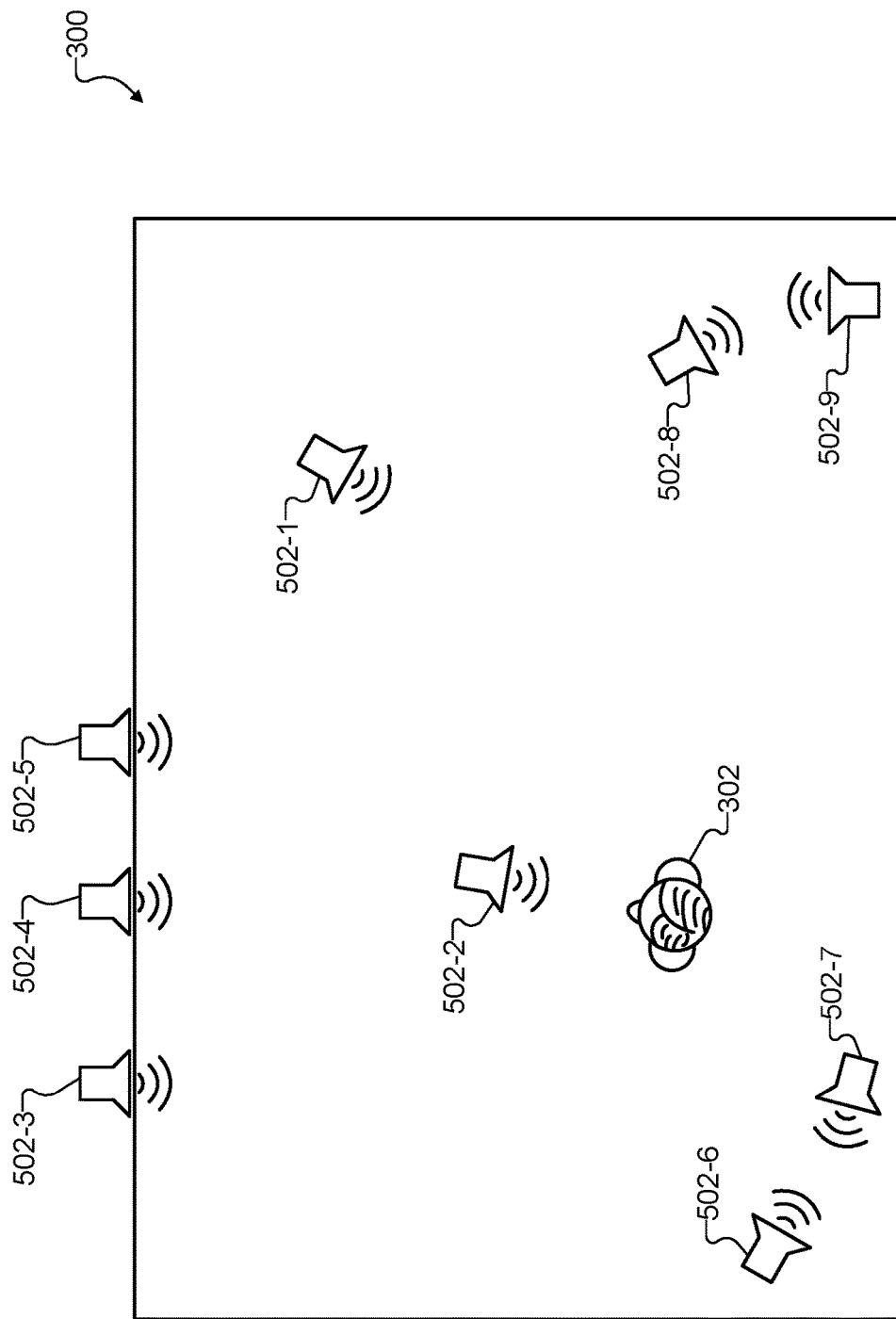
FIG. 5 illustrates an exemplary schematic view of a complex audio environment within the artificial reality world of FIG. 3 according to principles described herein.

FIG. 5 illustrates an exemplary schematic view of a complex audio environment within artificial reality world 300. Specifically, FIG. 5 illustrates a top view of artificial reality world 300 in which avatar 302 is presented not only with speech from one speaker, but from a plurality of different speakers 502 (e.g., speakers 502-1 through 502-9). While the propagation aspects described in relation to FIG. 4 are not explicitly illustrated in FIG. 5 for clarity, it will be understood that avatar 302 and each of speakers 502 may be associated with some or all of the same propagation effects described above in relation to FIG. 4. However, with the significantly larger number of sound sources included in the example of FIG. 5, it will be understood that the audio environment of artificial reality world 300 in FIG. 5 is significantly more complex than the audio environment of artificial reality world 300 in the example of FIG. 4.

As with speaker 402 in the example of FIG. 4, it will be understood that each of speakers 502 may be any type of speaker described herein. For instance, if artificial reality world 300 is implemented as a sports lounge, speaker 502-1 may represent a virtual stereo system playing music to be heard throughout the room, speaker 502-2 may represent another avatar who is currently chatting with avatar 302, speakers 502-3 through 502-5 may represent different characters on a media content presentation playing on a virtual television screen mounted on the wall, and speakers 502-6 through 502-9 may represent additional avatars within artificial reality world 300 who are chatting amongst themselves (i.e., engaging in conversations not necessarily intended by their respective users to be heard by the user of avatar 302).

It will be understood that a sports lounge is merely one example of the type of artificial reality world 300 that may be provided for users to experience together. In other examples, artificial reality world 300 may be implemented as an emergency response command center where multiple emergency responders can view multiple media content presentations on multiple screens and talk to one other conveniently to quickly solve problems even without physically being in the same room. In still other examples, artificial reality world 300 may be a VIP room at a virtual concert, a virtual party, a private virtual chatroom for a family or school class reunion, or any other suitable type of artificial reality world configured for use by any number of users for any purpose as may serve a particular implementation.

As described above, each of the sound propagation aspects illustrated in FIG. 4, as well as other suitable sound propagation aspects, may be accounted for in generating a simulated binaural audio signal to be presented to the user associated with avatar 302 (i.e., user 212). As such, it may be desirable for some or all of these aspects to be removed or reversed in order to prepare a signal to be analyzed by a speech-to-text converter to generate a closed captioning dataset. Additionally, in examples such as illustrated in FIG. 5 where multiple speakers are speaking concurrently, it may be desirable for speech originating from different speakers to be separated in order to prepare the different speech instances to be analyzed by a speech-to-text converter. As used herein, the process of separating out and filtering individual speech signals in preparation for a speech-to-text converter in these ways may be referred to as extracting one or more auto-transcribable speech signals.

Figure 6:
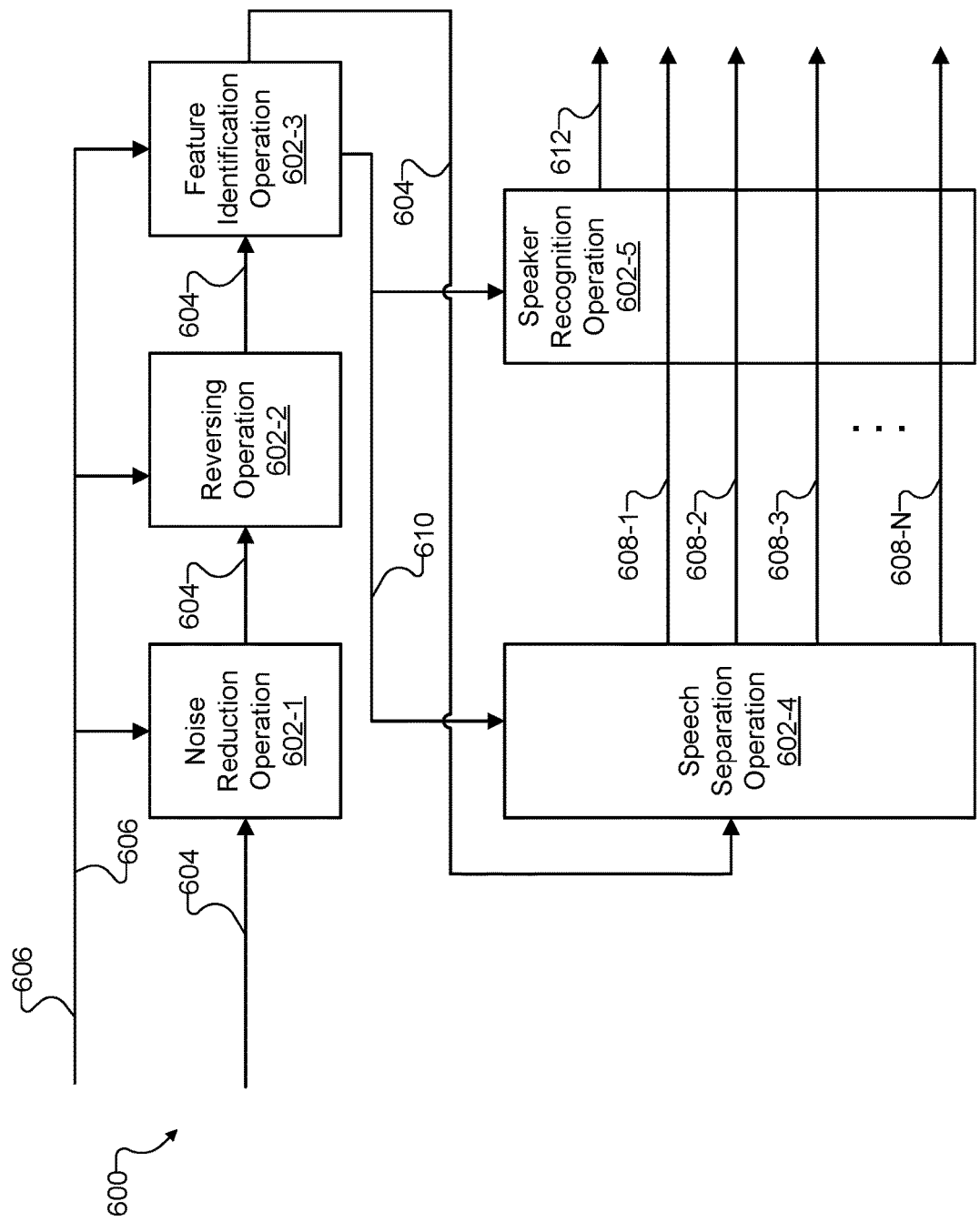
FIG. 6 illustrates exemplary operations that may be performed by a speech presentation system to extract auto-transcribable speech signals from a simulated binaural audio signal according to principles described herein.

To illustrate how such extracting may be performed, FIG. 6 shows an exemplary signal extraction 600 that may be performed by system 100 and that includes various exemplary operations 602 (i.e., operations 602-1 through 602-5) that may be performed to extract one or more auto-transcribable speech signals from a simulated binaural audio signal. System 100 may perform some or all of operations 602 to convert a simulated binaural audio signal 604 into a plurality of auto-transcribable speech signals 608 (i.e., auto-transcribable speech signals 608-1 through 608-N) based on acoustic propagation data 606. Specifically, simulated binaural audio signal 604 may be processed, concurrently or sequentially in any suitable order, by a noise reduction operation 602-1, a reversing operation 602-2, a feature identification operation 602-3, a speech separation operation 602-4, and a speaker recognition operation 602-5. In some examples, signal extraction 600 may be performed in real time so that closed captions may be generated and displayed live as speakers within artificial reality world 300 are speaking. Each of operations 602 will now be described in more detail.

System 100 may perform noise reduction operation 602-1 to remove noise from simulated binaural audio signal 604. As such, noise reduction operation 602-1 may increase a signal-to-noise ratio of simulated binaural audio signal 604 in any suitable way, and may involve removing various types of noise. For example, noise reduction operation 602 may remove noise recorded on any of the original speech signals from which simulated binaural audio signal 600 is rendered (e.g., noise in the room while a user is being recorded for a chat communication, background music playing together with speech in a media content presentation, etc.), noise introduced by any transmission or processing of simulated binaural audio signal 604 or its constituent signals prior to signal extraction 600, noise intentionally introduced onto simulated binaural audio signal 604 to recreate certain elements of artificial reality world 300 (e.g., non-speech sound effects associated with virtual objects included within artificial reality world 300), or any other noise as may be present in a particular example. In some examples, certain types of noise may be reduced or removed from simulated binaural audio signal 604 based on acoustic propagation data 606.

In some examples, acoustic propagation data 606 may be representative of a simulated environmental effect that is applied, within simulated binaural audio signal 604, to speech originating from a speaker in order to simulate the propagation of the speech to the avatar. For example, acoustic propagation data 606 may include data representative of simulated environmental effects that have been applied such as echoes and reverberation, attenuation of the overall volume or of certain frequencies based on the respective position and orientation of the avatar and the speakers, and other such effects described herein. In such examples, it may be desirable for these environmental effects to be reversed (i.e., withdrawn, unapplied, etc.) to prepare a signal for automatic transcribing by a speech-to-text converter.

Accordingly, system 100 may perform reversing operation 602-2 to reverse the simulated environmental effect or effects that may be applied to the speech represented by simulated binaural audio signal 604. For example, system 100 may perform reversing operation 602-2 based on the acoustic propagation data 606 by performing inverse operations to the operations performed to apply the environmental effects originally.

The noise reduction and environmental effect reversal performed in operations 602-1 and 602-2 may help to filter or "clean up" simulated binaural audio signal 604 to make it easier for a speech-to-text converter to process. However, if simulated binaural audio signal 604 includes a plurality of speech instances (e.g., from a plurality of speakers such as speakers 502 illustrated in the complex audio environment of FIG. 5), any degree of filtering and cleaning up simulated binaural audio signal 604 may still be insufficient to prepare the signal for processing by a speech-to-text converter that is configured to process only one speech instance at a time. Accordingly, simulated binaural audio signal 604 may also be processed by additional operations to break out multiple speech instances (e.g., one for each of the plurality of speakers included within artificial reality world 300) that all may be merged together in simulated binaural audio signal 604.

For example, feature identification operation 602-3 may be performed to identify, within simulated binaural audio signal 604, a plurality of features of the sound propagating to the avatar such that speech separation operation 602-4 may be performed based on the identified plurality of features of the sound propagating to the avatar. Sound features identified as part of the performance of feature identification operation 602-3 may include or be associated with various aspects of speech so as to collectively provide data indicative of a specific identify of a speaker from whom the speech originates. In other words, taken together, the features identified as part of feature identification operation 602-3 may serve as a vocal equivalent of a fingerprint, thereby allowing system 100 to positively distinguish one voice from another because system 100 may recognize each voice as belonging to specific known speakers.

To this end, the features identified as part of the performance of feature identification operation 602-3 may, in certain examples, include cepstral coefficients associated with specific voices of specific speakers. For instance, system 100 may detect and analyze a mel-frequency cepstral coefficient ("MFCC"), a gammatone frequency cepstral coefficient ("GFCC"), and/or other cepstral coefficients as may serve within a particular implementation to facilitate the identification of a particular voice. Additionally, in certain examples, machine learning techniques may be employed in association with feature identification operation 602-3 to facilitate system 100 in associating particular voices with particular speakers. For instance, by analyzing different manners in which different speakers annunciate particular vowel sounds, a machine learning technique may improve its ability to match speech instances to particular speakers. Specific voices may also be identified and matched to certain speakers in some implementations using comparison data stored in a biometric database. For example, the biometric database may include various data for various specific speakers (e.g., well-known people who may speak on media content presentations, users who have experienced artificial reality world 300 previously, etc.).

Another feature that may be identified for each speech instance included within simulated binaural audio signal 604 may be a root-mean-square ("RMS") magnitude of the speech instance. The RMS magnitude may indicate how near or far the avatar is from each speaker. For example, if the avatar with which simulated binaural audio signal 604 is associated is avatar 302 and simulated binaural audio signal 604 is a signal that includes speech from each of speakers 502 shown in FIG. 5, speech originating from speaker 502-2 may be identified to have a larger RMS magnitude than speaker 502-3 due to the relatively close proximity of speaker 502-2 and the relative distance to speaker 502-3. Accordingly, as part of feature identification operation 602-3, system 100 may identify that one speech instance included in simulated binaural audio signal 604 has a relatively low RMS magnitude while another has a relatively high RMS magnitude, indicating that two different speakers are likely present at different distances from avatar 302.

Other features similar to RMS magnitude may likewise be identified in like manner. For instance, system 100 may identify one speech instance as originating from the right-hand side of avatar 302 (e.g., due to ILD and ITD cues applies to simulated binaural audio signal 604), while another speech instance originates from the left-hand side of avatar 302. These identified features may similarly indicate that distinct speakers are present.

Based on the features identified as part of feature identification operation 602-3, speech separation operation 602-4 may break out simulated binaural audio signal 604 into a plurality of auto-transcribable speech signals 608. Specifically, system 100 may perform speech separation operation 602-4 by separating, based on a signal 610 representative of the plurality of features identified as part of feature identification operation 602-3, one speech signal representative of speech originating from one speaker (e.g., speaker 502-2) from an additional speech signal representative of speech originating from an additional speaker (e.g., speaker 502-3) that is separate from the one speaker. In this way, any suitable number (i.e., N) of auto-transcribable speech signals 608 may be generated.

System 100 may perform speech separation operation 602-4 in any suitable manner. For example, system 100 may determine, based on features such as RMS magnitude, that different speech instances are included within simulated binaural audio signal 604 originating at different distances from the avatar, and may separate out the speech instances into unique auto-transcribable speech signals based on the RMS magnitude. Similarly, system 100 may determine, based on features associated with ILD and/or ITD, that different speech instances are included within simulated binaural audio signal 604 originating from different angles with respect to the avatar, and may thus separate out the speech instances based on the ILD and ITD features. Additionally or alternatively, system 100 may determine based on voice-specific features (e.g., cepstral coefficients, etc.) that different voices are originating from the same distance and the same angle with respect to the avatar. In these examples, system 100 may determine that there are multiple speakers on a particular media content presentation being presented at a particular location within artificial reality world 300, and may separate out the speech instances of these speakers based on the voice-specific features. In other examples, combinations of these features and/or other features may be similarly used to separate speech instances into auto-transcribable speech signals 608 in any manner as may serve a particular implementation.

Additionally, in certain implementations, machine learning, artificial intelligence, multivariate statistics, digital signal processing, and other such techniques may be employed to facilitate speech separation operation 602-4. For instance, system 100 may perform speech separation operation 602-4 using time-frequency representations of audio signals such as simulated binaural audio signal 604 or other suitable audio signals. Such time-frequency representations may be used to extract features and/or mathematical models from the audio signals. For example, the time-frequency representations may be used in combination with machine learning, statistical algorithms, and/or other techniques mentioned above, or may be used in isolation.

System 100 may perform speaker recognition operation 602-5 to generate a metadata signal 612 indicative of which auto-transcribable speech signal 608 goes with which speaker within artificial reality world 300. Specifically, system 100 may perform speaker recognition operation 602-5 by determining that a speech signal representative of speech originating from a first speaker (e.g., speaker 502-2) corresponds to the first speaker and not to a second speaker (e.g., such as speaker 502-3). Additionally, system 100 may likewise determine that an additional speech signal representative of the speech originating from the second speaker corresponds to the second speaker and not to the first speaker. In some examples, metadata signal 612 may indicate how many speech instances are currently detected (i.e., how many auto-transcribable speech signals 608 are currently available) and which speaker each auto-transcribable speech signal 608 is associated with. In this way, as will be described in more detail below, each closed captioning dataset generated from each of auto-transcribable speech signals 608 may be associated with a particular speaker as the closed captions are presented to the user by the media player device.

As described above, media player devices may be used by users to access and experience artificial reality worlds. For example, media player device 210 may be configured to generate (e.g., based on data received from artificial reality provider system 202) a 3D representation of artificial reality world 300 to be experienced by user 212 from an arbitrary experience location (e.g., a dynamically selectable location selected by user 212 and corresponding to an arbitrary virtual location within artificial reality world 300). To this end, media player device 210 may include or be implemented by any device capable of presenting a field of view of an artificial reality world and detecting user input from user 212 to dynamically update the content of artificial reality world 300 presented within the field of view as user 212 experiences artificial reality world 300.

To illustrate, FIG. 7A shows an exemplary implementation of media player device 210 that may be used by user 212 to experience artificial reality media content. As shown, the implementation of media player device 210 shown in FIG. 7A may be implemented as a head-mounted artificial reality device (e.g., a virtual reality gaming device) that includes a head-mounted display screen. In other examples, other form factors such as a personal computer device (e.g., a desktop computer, laptop computer, etc.), a mobile or wireless device (e.g., a smartphone, a tablet device, etc., possibly mounted to the head of user 212 by means of a head mount apparatus), or another suitable device or configuration of devices may be used.

In some examples, it may be undesirable for user 212 to be limited to one or more discrete positions within artificial reality world 300. As such, artificial reality data generated and transmitted to media player device 210 may be configured to provide sufficient data to allow artificial reality world 300 to be rendered from any dynamically selectable experience location within the world. For example, the dynamically selectable experience location may be selected by user 212 while user 212 is experiencing artificial reality world 300 using media player device 210.

As used herein, an "arbitrary experience location" may refer to any virtual point in space associated with an artificial reality world (e.g., particularly a virtual reality-type world). For example, arbitrary experience locations are not limited to fixed positions associated with capture devices (e.g., video cameras) that may capture a real-world scene upon which artificial reality world 300 is based, but also include positions between the capture devices.

FIG. 7B illustrates an exemplary artificial reality experience 700 in which user 212 is presented with exemplary artificial reality media content representative of artificial reality world 300 as experienced from a dynamically selectable arbitrary experience location within artificial reality world 300. Specifically, artificial reality media content 702 is presented within a field of view 704 that shows artificial reality world 300 from an arbitrary experience location in front of the sofa in artificial reality world 300. As shown, artificial reality world 300 may be available for user 212 to experience by providing user input (e.g., head movements, keyboard input, etc.) to look around and/or to move around (i.e., dynamically select different experience locations within) artificial reality world 300.

For example, field of view 704 may provide a window through which user 212 may easily and naturally look around artificial reality world 300. Field of view 704 may be presented by media player device 210 (e.g., on a display screen of media player device 210) and may include video depicting objects surrounding user 212 within artificial reality world 300. Additionally, field of view 704 may dynamically change in response to user input provided by user 212 as user 212 experiences artificial reality world 300. For example, media player device 210 may detect user input (e.g., moving or turning the display screen upon which field of view 704 is presented, changing to a new experience location, etc.). In response, field of view 704 may display different objects and/or objects seen from a different vantage point or experience location in place of the objects seen from the previous vantage point or experience location.

In FIG. 7B, artificial reality world 300 is illustrated as a semi-sphere, indicating that user 212 may look in any direction within artificial reality world 300 that is substantially forward, backward, left, right, and/or up from the experience location currently selected. In other examples, artificial reality world 300 may include an entire 360° by 180° sphere such that user 212 may also look down. Additionally, user 212 may move around to other experience locations within artificial reality world 300 (e.g., sitting on the sofa, etc.).

Once a closed captioning dataset has been generated based on one of auto-transcribable speech signals 608, the closed captioning dataset may be provided to media player device 210 as user 212 experiences artificial reality world 300 to facilitate the user's understanding of speech in any suitable way. For instance, in certain examples, the providing of the closed captioning dataset to media player device 210 may include presenting (e.g., on a display screen associated with media player device 210 and upon which artificial reality world 300 is presented) the closed captioning dataset in real time as speech originates from the speaker within artificial reality world 300. Additionally, in examples where multiple speakers are speaking concurrently within artificial reality world 300, media player device may present closed captioning datasets in ways that clearly indicate which closed captions are associated with which speaker, while providing minimal distraction to user 212 during the artificial reality experience.

For example, if media player device 210 is able to determine that user 212 is engaged in a face-to-face conversation with a particular other avatar within artificial reality world 300, or is specifically watching a particular media content presentation being presented on a screen within artificial reality world 300, media player device 210 may determine that any closed captioning data other than the data associated with the other avatar or the particular media content presentation would be distracting and unhelpful to user 212. As such, media player device 210 may automatically and prominently display closed captions associated with the relevant speaker (i.e., the other avatar or the particular media content presentation being watched) while minimizing or abstaining from displaying closed captions associated with other speakers in artificial reality world 300.

In other examples, however, it may not be possible for media player device 210 to automatically and accurately determine which speaker user 212 may wish to focus in on. Accordingly, in these examples, media player device 210 may provide customizable options to the user for displaying closed captioning data in whatever way the user prefers.

Figure 8A:
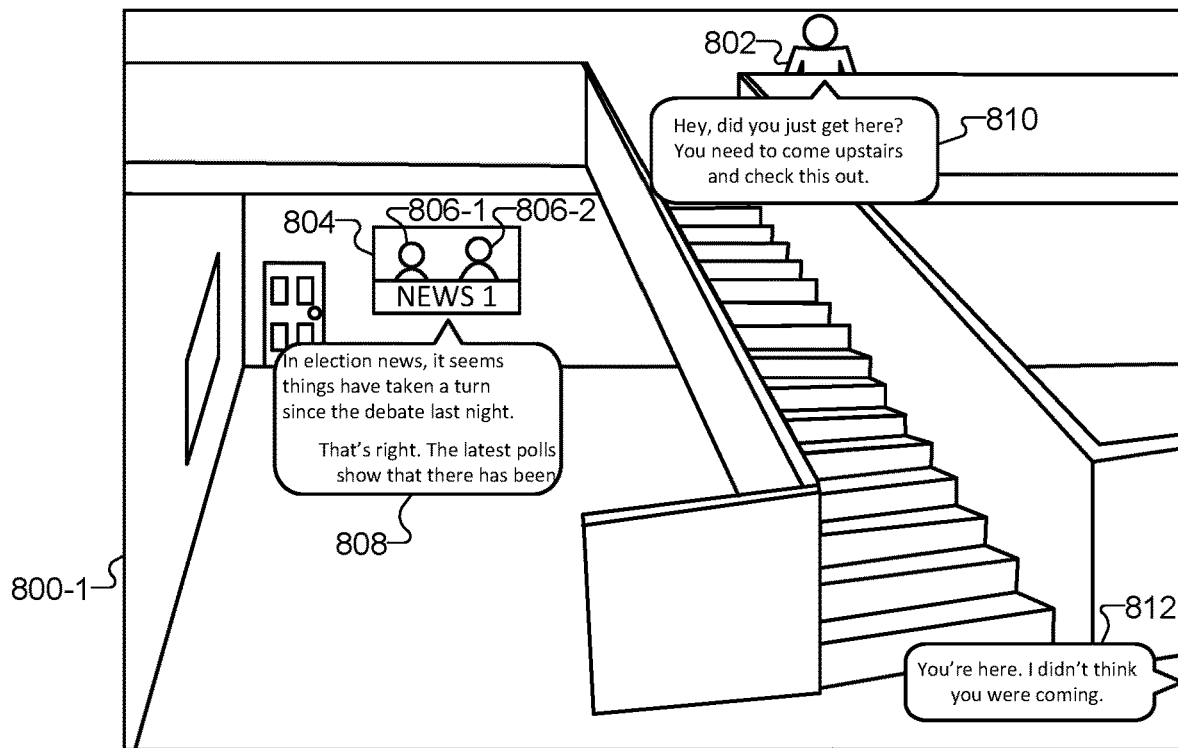
FIG. 8A illustrates an exemplary screenshot of a media player device display screen that is presenting a plurality of closed captioning datasets within an artificial reality world according to principles described herein.
Figure 8B:
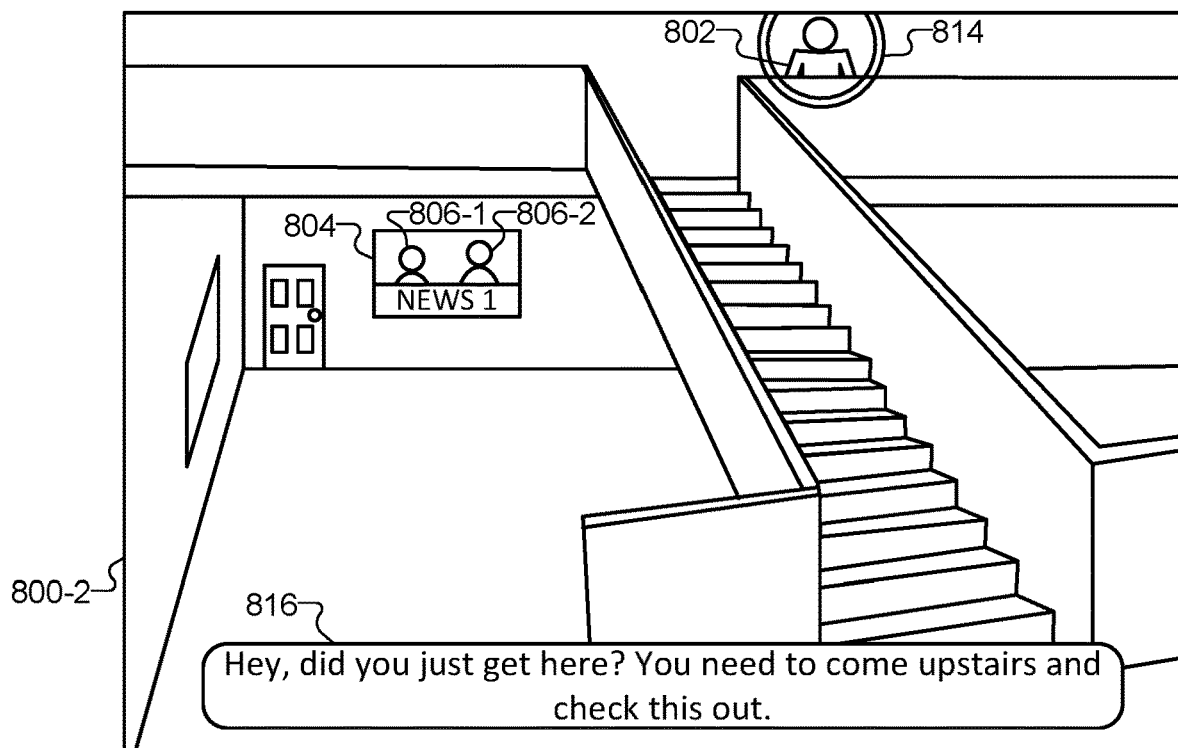
FIG. 8B illustrates an exemplary screenshot of a media player device display screen that is presenting a user-selected closed captioning dataset within an artificial reality world according to principles described herein.

To illustrate, FIGS. 8A and 8B show exemplary screenshots 800 (i.e., screenshot 800-1 in FIG. 8A and screenshot 800-2 in FIG. 8B) of a display screen of media player device 210 as the display screen presents a closed captioning dataset within artificial reality world 300. In FIGS. 8A and 8B, a different part of artificial reality world 300 (or a different implementation of artificial reality world 300) is shown compared to what is illustrated in FIG. 3. Specifically, in screenshots 800, artificial reality world 300 is shown to include an additional avatar 802 standing at the top of a staircase while a media content presentation (i.e., a similar news program as illustrated in FIG. 3) is being presented in an adjoining room to the one in which the avatar of user 212 is located.

In the example of FIGS. 8A and 8B, both avatar 802 and speakers 806-1 and/or 806-2 on media content presentation 804 may be speaking concurrently, while no other speaker is nearby the avatar of user 212. Accordingly, it may not be possible for media player device 210 to accurately and reliably determine which of the three speakers (i.e., avatar 802, speaker 806-1, and speaker 806-2) user 212 may want to listen to and which ones he or she may want to tune out. Moreover, there may be additional speakers that are within the vicinity of the avatar of user 212 (e.g., such that the additional speakers can be heard by user 212), but that are not shown in screenshots 800 (e.g., because the additional speakers are off-screen, such as behind the avatar of user 212). Just as media player device 210 may not presume to know which of the three speakers explicitly shown in screenshots 800 user 212 wishes to listen to, media player device 210 may likewise not know whether or not user 212 wishes to listen to one or more of these off-screen speakers that are not shown in screenshots 800.

Thus, screenshot 800-1 illustrates a first optional mode of operation that media player device 210 may provide to user 212. In screenshot 800-1, closed captions 808 are overlaid next to media content presentation 804 and are formatted so as to clearly indicate which speaker is saying what (i.e., captions for speaker 806-1 are left justified since speaker 806-1 is on the left, while captions for speaker 806-2 are right justified). Closed captions 810 are also overlaid next to avatar 802 to indicate what the other user associated with avatar 802 is saying. Additionally, closed captions 812 are overlaid toward the bottom of the screen and pointing in a general direction of an off-screen speaker that user 212 may see if he or she turns to look in the direction indicated (e.g., to the right in this example). In this way, user 212 may be able to read and easily understand what all three on-screen speakers, as well as additional off-screen speakers, are saying at once, or may ignore speech that he or she is not interested in and only read closed captions for the speaker he or she wants to listen to.

Conversely, user 212 may feel that the screen is too cluttered with all speech overlaid in speech bubbles on the screen (particularly in situations where there are more than two speakers). As such, screenshot 800-2 illustrates another optional mode of operation that may be offered by media player device 210. In this example, media player device 210 may give user 212 customizable control over how he or she wants to listen to things in artificial reality world 300. Specifically, in screenshot 800-2, a selector mechanism 814 (e.g., a highlighted ring or box or any other such suitable mechanism for selecting one speaker over another) indicates that user 212 has selected to read captions associated with avatar 802. User 212 may designate selector mechanism 814 to user 802 in any suitable manner. However, as shown, no similar selector mechanism is highlighting media content presentation 804, indicating that user 212 may not currently be interested in understanding the speech coming from media content presentation 804 (i.e., the speech from speakers 806-1 and 806-2). As such, closed captions 816 are displayed at the bottom of the screen or in another unobtrusive place (i.e., to avoid unwanted clutter) only for speech originating from avatar 802, because only avatar 802 has been selected by user 212. In other examples, other modes of operation for displaying closed captioning datasets so as to facilitate understanding of speech presented in an artificial reality world may also be employed as may serve a particular implementation.

Figure 9:
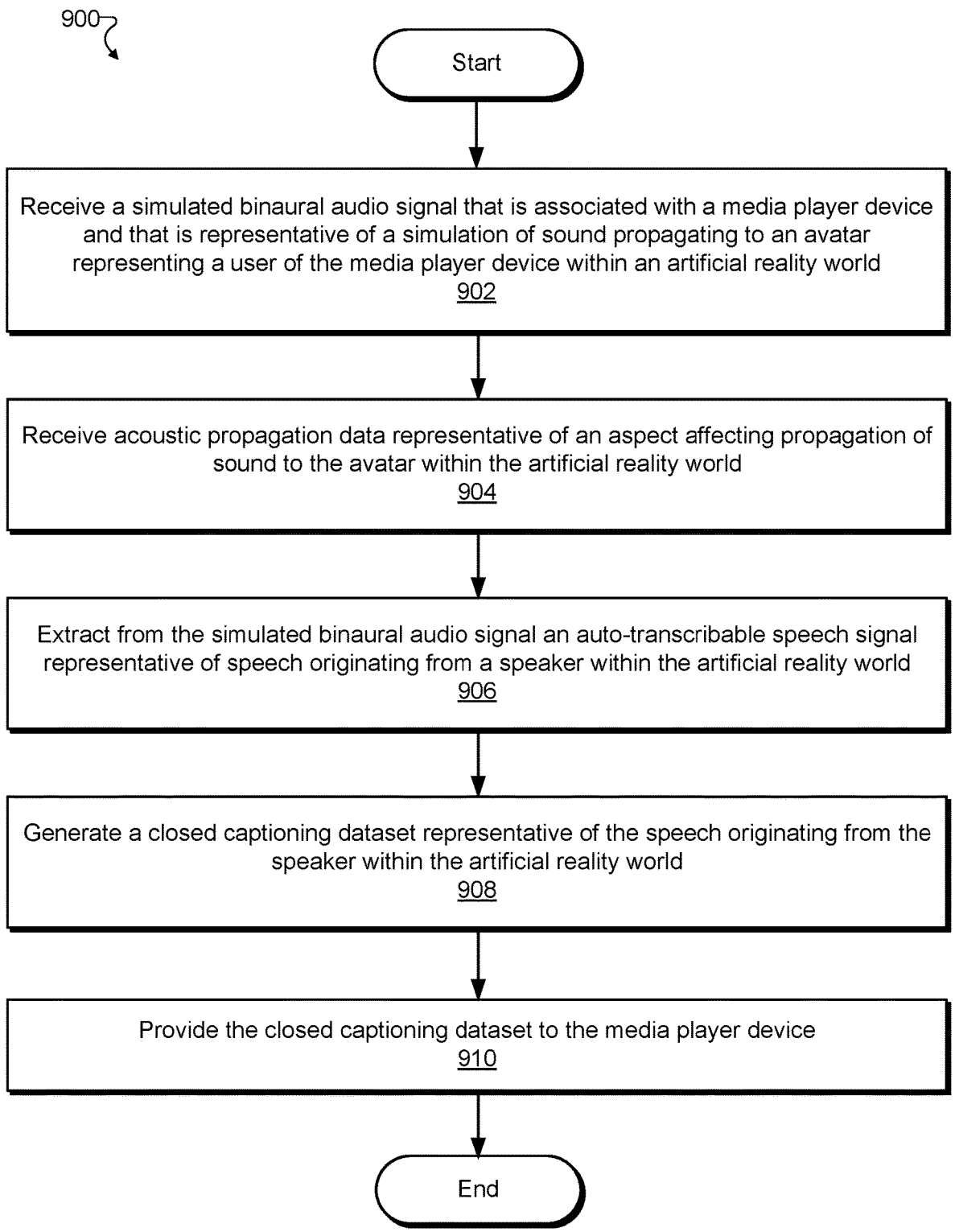
FIG. 9 illustrates an exemplary speech presentation method for facilitating understanding of speech presented in an artificial reality world according to principles described herein.

FIG. 9 illustrates an exemplary speech presentation method 900 for facilitating understanding of speech presented in an artificial reality world. While FIG. 9 illustrates exemplary operations according to one embodiment, other embodiments may omit, add to, reorder, and/or modify any of the operations shown in FIG. 9. One or more of the operations shown in FIG. 9 may be performed by system 100, any components included therein, and/or any implementation thereof.

In operation 902, a speech presentation system may receive a simulated binaural audio signal associated with a media player device that is presenting an artificial reality world to a user of the media player device. For example, the simulated binaural audio signal may be representative of a simulation of sound propagating to an avatar representing the user within the artificial reality world. Operation 902 may be performed in any of the ways described herein.

In operation 904, the speech presentation system may further receive acoustic propagation data representative of an aspect affecting propagation of sound to the avatar within the artificial reality world. Operation 904 may be performed in any of the ways described herein.

In operation 906, the speech presentation system may extract an auto-transcribable speech signal from the simulated binaural audio signal received in operation 902. For example, the auto-transcribable speech signal may be representative of speech originating from a speaker within the artificial reality world, and the extracting may be performed based on the acoustic propagation data received in operation 904. Operation 906 may be performed in any of the ways described herein.

In operation 908, the speech presentation system may generate a closed captioning dataset representative of the speech originating from the speaker. For example, the speech presentation system may generate the closed captioning dataset based on the auto-transcribable speech signal extracted in operation 906. Operation 908 may be performed in any of the ways described herein.

In operation 910, the speech presentation system may provide the closed captioning dataset to the media player device associated with the simulated binaural audio signal received in operation 902. Operation 910 may be performed in any of the ways described herein.

Figure 10:
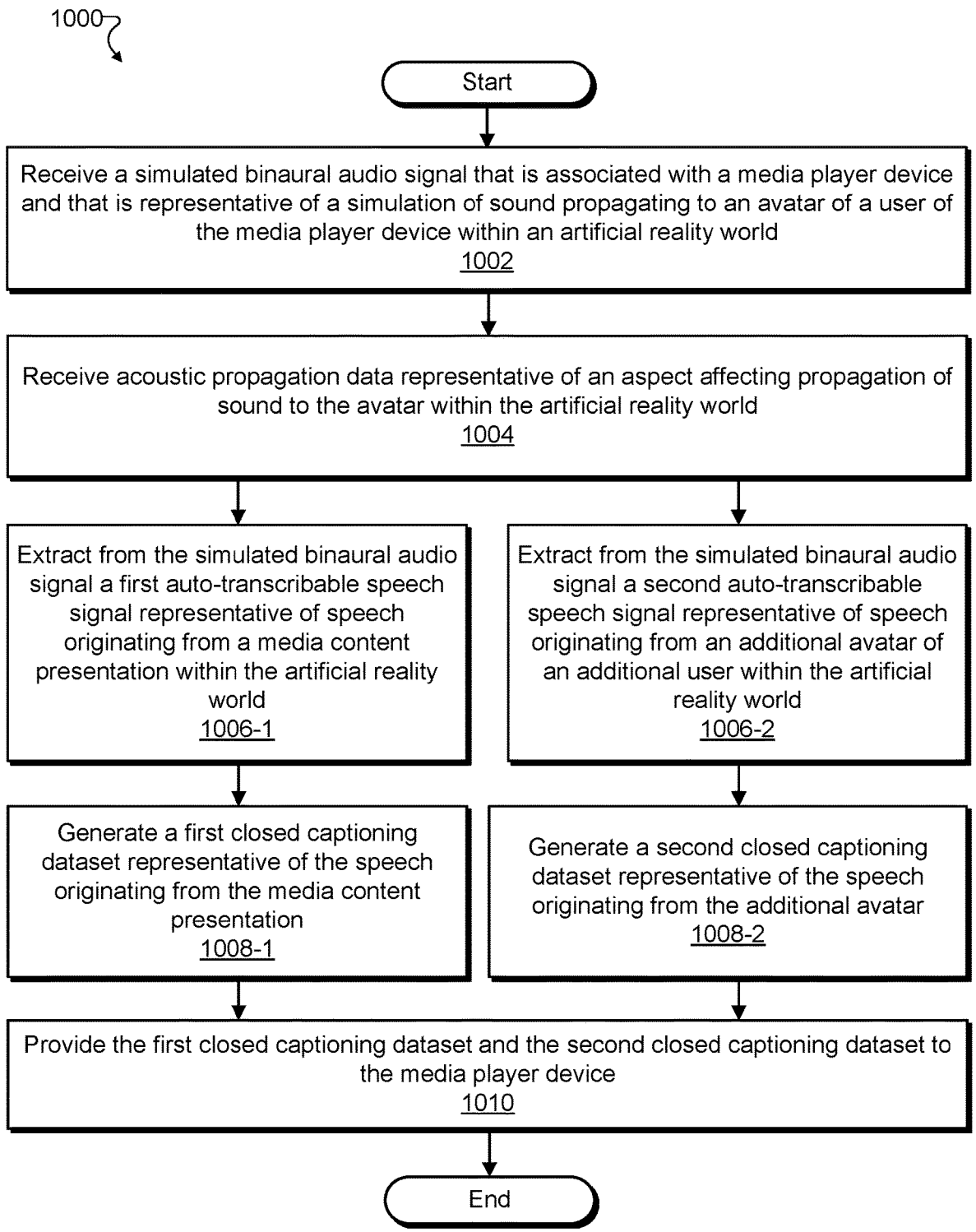
FIG. 10 illustrates another exemplary speech presentation method for facilitating understanding of speech presented in an artificial reality world according to principles described herein.

FIG. 10 illustrates an exemplary speech presentation method 1000 for facilitating understanding of speech presented in an artificial reality world. While FIG. 10 illustrates exemplary operations according to one embodiment, other embodiments may omit, add to, reorder, and/or modify any of the operations shown in FIG. 10. One or more of the operations shown in FIG. 10 may be performed by system 100, any components included therein, and/or any implementation thereof.

In operation 1002, a speech presentation system may receive a simulated binaural audio signal associated with a media player device that is presenting an artificial reality world to a user of the media player device. For example, the simulated binaural audio signal may be representative of a simulation of sound propagating to an avatar of the user within the artificial reality world. Operation 1002 may be performed in any of the ways described herein.

In operation 1004, the speech presentation system may further receive acoustic propagation data representative of an aspect affecting propagation of sound to the avatar within the artificial reality world. Operation 1004 may be performed in any of the ways described herein.

In operations 1006-1 and 1006-2, the speech presentation system may extract a plurality of auto-transcribable speech signals from the simulated binaural audio signal received in operation 1002. For example, the speech presentation system may extract the auto-transcribable speech signals based on the acoustic propagation data received in 1004.

More particularly, in operation 1006-1, the speech presentation system may extract a first auto-transcribable speech signal representative of speech originating from a media content presentation. For example, the media content presentation may be received from a media provider distinct from the media player device and may be presented within the artificial reality world. In operation 1006-2, the speech presentation system may extract a second auto-transcribable speech signal representative of speech originating from an additional avatar. For example, the additional avatar may represent, within the artificial reality world, an additional user of an additional media player device that is presenting the artificial reality world to the additional user concurrently with the presenting of the artificial reality world to the user. Operations 1006-1 and 1006-2 may be performed in any of the ways described herein. Additionally, in some examples, operations 1006-1 and 1006-2 may be performed concurrently (i.e., in parallel, at the same time).

In operation 1008-1, the speech presentation system may generate a first closed captioning dataset representative of the speech originating from the media content presentation, while, in operation 1008-2, the speech presentation system may generate a second closed captioning dataset representative of the speech originating from the additional avatar. For example, the first closed captioning dataset may be generated based on the first auto-transcribable speech signal extracted in operation 1006-1, while the second closed captioning dataset may be generated based on the second auto-transcribable speech signal extracted in operation 1006-2. Operations 1008-1 and 1008-2 may be performed in any of the ways described herein. Additionally, in some examples, operations 1008-1 and 1008-2 may be performed concurrently.

In operation 1010, the speech presentation system may provide the first and second closed captioning datasets generated in operations 1008-1 and 1008-2, respectively, to the media player device associated with the simulated binaural audio signal received in operation 1002. For example, the speech presentation system may provide the first closed captioning dataset so as to correspond to the media content presentation, and may provide the second closed captioning dataset so as to correspond to the additional avatar. Operation 1010 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
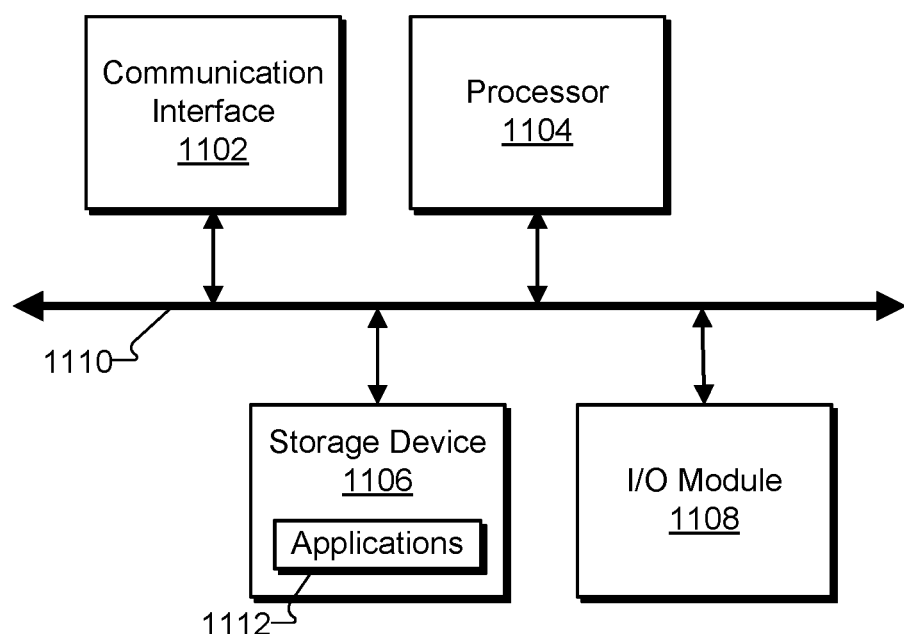
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with facilities 102 through 106 of system 100. Likewise, storage facility 108 of system 100 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a speech presentation system, a simulated binaural audio signal associated with a media player device that is presenting an artificial reality world to a user of the media player device, wherein:
   the simulated binaural audio signal is representative of a simulation of sound propagating to an avatar representing the user within the artificial reality world, and
   the simulated binaural audio signal merges together a plurality of concurrent speech instances originating from a plurality of different speakers speaking concurrently from different positions within the artificial reality world;
   receiving, by the speech presentation system, acoustic propagation data representative of a simulated propagation effect that is applied, within the simulated binaural audio signal, to speech originating from the different speakers in order to simulate propagation of the speech to the avatar, the simulated propagation effect including one or more of a reverberation effect to simulate natural echoes or an attenuation effect to simulate a natural drop-off of a volume of the speech;
   extracting, by the speech presentation system from the simulated binaural audio signal and based on the acoustic propagation data, a plurality of auto-transcribable speech signals representative of the speech originating from the different speakers speaking concurrently from the different positions within the artificial reality world;
   generating, by the speech presentation system based on the plurality of auto-transcribable speech signals, a plurality of closed captioning datasets representative of the plurality of concurrent speech instances originating from the plurality of different speakers; and
   providing, by the speech presentation system to the media player device, the plurality of closed captioning datasets.

2. The method of claim 1, wherein the plurality of different speakers includes:
   a first speaker included on a media content presentation that is received from a media provider distinct from the media player device and that is presented within the artificial reality world; and
   a second speaker implemented by an additional avatar representing, within the artificial reality world, an additional user of an additional media player device, the additional media player device presenting the artificial reality world to the additional user concurrently with the presenting of the artificial reality world to the user.

3. The method of claim 1, wherein at least one of the plurality of different speakers speaking concurrently from the different positions within the artificial reality world is an additional avatar representing, within the artificial reality world, an additional user of an additional media player device, the additional media player device presenting the artificial reality world to the additional user concurrently with the presenting of the artificial reality world to the user.

4. The method of claim 1, wherein at least one of the plurality of different speakers speaking concurrently from the different positions within the artificial reality world is included on a media content presentation that is received from a media provider distinct from the media player device and that is presented within the artificial reality world.

5. The method of claim 1, wherein at least one of the plurality of different speakers speaking concurrently from the different positions within the artificial reality world is a non-player character within the artificial reality world, the non-player character presented based on data stored within the media player device.

6. The method of claim 1, wherein the providing of the plurality of closed captioning datasets to the media player device includes presenting, on a display screen associated with the media player device and upon which the artificial reality world is presented, at least one of the plurality of closed captioning datasets in real time as the speech originates from the different speakers speaking concurrently from the different positions within the artificial reality world.

7. The method of claim 1, wherein the extracting of the plurality of auto-transcribable speech signals from the simulated binaural audio signal includes performing a noise reduction operation to remove noise from the simulated binaural audio signal.

8. The method of claim 1, wherein:
   the extracting of the plurality of auto-transcribable speech signals from the simulated binaural audio signal includes identifying, within the simulated binaural audio signal, a plurality of features of the sound propagating to the avatar; and
   the extracting of the plurality of auto-transcribable speech signals from the simulated binaural audio signal is further based on the identified plurality of features of the sound propagating to the avatar.

9. The method of claim 8, wherein the extracting of the plurality of auto-transcribable speech signals from the simulated binaural audio signal further includes separating, based on the identified plurality of features of the sound propagating to the avatar, a first speech signal representative of speech originating from a first speaker in the plurality of different speakers, and a second speech signal representative of speech originating from a second speaker in the plurality of different speakers.

10. The method of claim 9, wherein the extracting of the plurality of auto-transcribable speech signals from the simulated binaural audio signal further includes determining:
that the first speech signal representative of the speech originating from the first speaker corresponds to the first speaker and not to the second speaker, and
that the second speech signal representative of the speech originating from the second speaker corresponds to the second speaker and not to the first speaker.

11. A method comprising:
receiving, by a closed captioning system, a simulated binaural audio signal associated with a media player device that is presenting an artificial reality world to a user of the media player device, wherein:
the simulated binaural audio signal is representative of a simulation of sound propagating to an avatar of the user within the artificial reality world, and
the simulated binaural audio signal merges together a plurality of concurrent speech instances originating from a plurality of different speakers speaking concurrently from different positions within the artificial reality world;
receiving, by the closed captioning system, acoustic propagation data representative of a simulated propagation effect that is applied, within the simulated binaural audio signal, to speech originating from the different speakers in order to simulate propagation of the speech to the avatar, the simulated propagation effect including one or more of a reverberation effect to simulate natural echoes or an attenuation effect to simulate a natural drop-off of a volume of the speech;
extracting, by the closed captioning system from the simulated binaural audio signal and based on the acoustic propagation data, a plurality of auto-transcribable speech signals including
a first auto-transcribable speech signal representative of speech originating from a media content presentation that is received from a media provider distinct from the media player device and that is presented within the artificial reality world, and
a second auto-transcribable speech signal representative of speech originating from an additional avatar representing, within the artificial reality world, an additional user of an additional media player device, the additional media player device presenting the artificial reality world to the additional user concurrently with the presenting of the artificial reality world to the user;
generating, by the closed captioning system based on the first auto-transcribable speech signal, a first closed captioning dataset representative of the speech originating from the media content presentation;
generating, by the closed captioning system based on the second auto-transcribable speech signal, a second closed captioning dataset representative of the speech originating from the additional avatar; and
providing, by the closed captioning system to the media player device, the first closed captioning dataset so as to correspond to the media content presentation, and the second closed captioning dataset so as to correspond to the additional avatar.

12. A system comprising:
at least one physical computing device that
receives a simulated binaural audio signal associated with a media player device that is presenting an artificial reality world to a user of the media player device, wherein:
the simulated binaural audio signal is representative of a simulation of sound propagating to an avatar of the user within the artificial reality world, and
the simulated binaural audio signal merges together a plurality of concurrent speech instances originating from a plurality of different speakers speaking concurrently from different positions within the artificial reality world;
receives acoustic propagation data representative of a simulated propagation effect that is applied, within the simulated binaural audio signal, to speech originating from the different speakers in order to simulate propagation of the speech to the avatar, the simulated propagation effect including one or more of a reverberation effect to simulate natural echoes or an attenuation effect to simulate a natural drop-off of a volume of the speech;
extracts, from the simulated binaural audio signal and based on the acoustic propagation data, a plurality of auto-transcribable speech signals representative of the speech originating from the different speakers speaking concurrently from the different positions within the artificial reality world;
generates, based on the plurality of auto-transcribable speech signals, a plurality of closed captioning datasets representative of the plurality of concurrent speech instances originating from the plurality of different speakers; and
provides the plurality of closed captioning datasets to the media player device.

13. The system of claim 12, wherein the plurality of different speakers includes:
a first speaker included on a media content presentation that is received from a media provider distinct from the media player device and that is presented within the artificial reality world; and
a second speaker implemented by an additional avatar representing, within the artificial reality world, an additional user of an additional media player device, the additional media player device presenting the artificial reality world to the additional user concurrently with the presenting of the artificial reality world to the user.

14. The system of claim 12, wherein at least one of the plurality of different speakers speaking concurrently from the different positions within the artificial reality world is:
an additional avatar representing, within the artificial reality world, an additional user of an additional media player device, the additional media player device presenting the artificial reality world to the additional user concurrently with the presenting of the artificial reality world to the user;
a speaker included on a media content presentation that is received from a media provider distinct from the media player device and that is presented within the artificial reality world; or
a non-player character within the artificial reality world, the non-player character presented based on data stored within the media player device.

15. The system of claim 12, wherein the at least one physical computing device extracts the plurality of auto-transcribable speech signals from the simulated binaural audio signal by performing operations including a noise reduction operation configured to remove noise from the simulated binaural audio signal.

16. The system of claim 12, wherein:
the at least one physical computing device extracts the plurality of auto-transcribable speech signals from the simulated binaural audio signal by performing operations including an operation configured to identify, within the simulated binaural audio signal, a plurality of features of the sound propagating to the avatar; and
the at least one physical computing device extracts the plurality of auto-transcribable speech signals from the simulated binaural audio signal further based on the identified plurality of features of the sound propagating to the avatar.

17. The system of claim 16, wherein the operations performed by the at least one physical computing device to extract the plurality of auto-transcribable speech signals from the simulated binaural audio signal further include an operation configured to separate, based on the identified plurality of features of the sound propagating to the avatar, a first speech signal representative of speech originating from a first speaker in the plurality of different speakers, and a second speech signal representative of speech originating from a second speaker in the plurality of different speakers.

18. The system of claim 17, wherein the operations performed by the at least one physical computing device to extract the plurality of auto-transcribable speech signals from the simulated binaural audio signal further include operations configured to determine:
that the first speech signal representative of the speech originating from the first speaker corresponds to the first speaker and not to the second speaker, and
that the second speech signal representative of the speech originating from the second speaker corresponds to the second speaker and not to the first speaker.

19. The method of claim 1, wherein the extracting of the plurality of auto-transcribable speech signals from the simulated binaural audio signal includes filtering, based on the acoustic propagation data, the simulated binaural audio signal to remove the simulated propagation effect that is applied to the speech.

20. The system of claim 12, wherein the at least one physical computing device extracts the plurality of auto-transcribable speech signals from the simulated binaural audio signal by performing operations including a filtering operation configured to remove, based on the acoustic propagation data, the simulated propagation effect that is applied to the speech.

* * * * *